United States Patent
Toyoizumi et al.

(10) Patent No.: US 9,798,262 B2
(45) Date of Patent: Oct. 24, 2017

(54) METHOD OF PRODUCING TONER

(71) Applicant: CANON KABUSHIKI KAISHA, Tokyo (JP)

(72) Inventors: Noritaka Toyoizumi, Mishima (JP); Yusuke Kosaki, Susono (JP); Tetsuya Kinumatsu, Mishima (JP); Kenji Aoki, Mishima (JP); Shuntaro Watanabe, Hadano (JP); Takaaki Kaya, Suntou-gun (JP); Atsushi Tani, Suntou-gun (JP); Kazumichi Nakahama, Suntou-gun (JP); Shinnosuke Koji, Yokohama (JP); Takashige Kasuya, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/973,531

(22) Filed: Dec. 17, 2015

(65) Prior Publication Data
US 2016/0187798 A1  Jun. 30, 2016

(30) Foreign Application Priority Data

Dec. 26, 2014 (JP) .................................. 2014-263978
Dec. 10, 2015 (JP) .................................. 2015-240888

(51) Int. Cl.
*G03G 9/08* (2006.01)
*G03G 9/093* (2006.01)
(Continued)

(52) U.S. Cl.
CPC .......... *G03G 9/09392* (2013.01); *C08J 3/126* (2013.01); *C08L 67/02* (2013.01);
(Continued)

(58) Field of Classification Search
CPC ........................ G03G 9/081; G03G 9/09392
See application file for complete search history.

(56) References Cited

U.S. PATENT DOCUMENTS

| | | |
|---|---|---|
| 5,571,653 A | 11/1996 | Kasuya et al. |
| 5,578,407 A | 11/1996 | Kasuya et al. |

(Continued)

FOREIGN PATENT DOCUMENTS

| | | |
|---|---|---|
| CN | 101322080 | 12/2008 |
| CN | 103975277 | 8/2014 |

(Continued)

OTHER PUBLICATIONS

Machine English language translation of 2012165636 dated Dec. 6, 2012.*

(Continued)

*Primary Examiner* — Hoa V Le
(74) *Attorney, Agent, or Firm* — Fitzpatrick Cella Harper and Scinto

(57) ABSTRACT

Provided is a method of producing a toner including the steps of: mixing a resin solution comprising a resin R, a colorant, and an organic solvent, a resin fine particle comprising a resin S containing an element α, and carbon dioxide to form a droplet having a surface covered with the resin fine particle; introducing carbon dioxide in a liquid state and pressurizing to extract the organic solvent in the droplet; and removing the extracted organic solvent together with the carbon dioxide to provide a toner particle. In the method of producing a toner, when the resin fine particle is treated with the carbon dioxide in a liquid state, a change in amount of the element α on the surface of the resin fine particle after the treatment as compared to the amount before the treatment falls within a specific range.

10 Claims, 1 Drawing Sheet

(51) Int. Cl.
*C08J 3/12* (2006.01)
*C08L 67/02* (2006.01)

(52) U.S. Cl.
CPC ...... *G03G 9/09328* (2013.01); *C08J 2367/02* (2013.01); *C08J 2467/02* (2013.01); *C08J 2483/06* (2013.01); *C08J 2483/07* (2013.01)

(56) References Cited

U.S. PATENT DOCUMENTS

| | | | |
|---|---|---|---|
| 5,814,429 | A | 9/1998 | Kawakami et al. |
| 6,586,151 | B1 | 7/2003 | Naka et al. |
| 8,142,972 | B2 | 3/2012 | Hotta et al. |
| 8,178,275 | B2 | 5/2012 | Tani et al. |
| 8,603,712 | B2 | 12/2013 | Aoki et al. |
| 8,846,284 | B2 | 9/2014 | Kinumatsu et al. |
| 9,056,955 | B2 | 6/2015 | Mizumori et al. |
| 9,176,410 | B2 | 11/2015 | Tani et al. |
| 2014/0349232 | A1 | 11/2014 | Kinumatsu et al. |
| 2014/0356777 | A1 | 12/2014 | Tani et al. |
| 2016/0187797 | A1* | 6/2016 | Kosaki ............... G03G 9/09371 430/110.2 |

FOREIGN PATENT DOCUMENTS

| | | | | |
|---|---|---|---|---|
| JP | 2008-208164 | A | 9/2008 | |
| JP | 2009-52005 | A | 3/2009 | |
| JP | 2010-132851 | A | 6/2010 | |
| JP | 2011-094135 | | 5/2011 | |
| JP | 2013-11884 | A | 1/2013 | |
| JP | 2013-137496 | A | 7/2013 | |
| JP | 2013-137535 | A | 7/2013 | |
| WO | 2012165636 | * | 12/2012 | ............... G03G 9/08 |
| WO | 2012165637 | * | 12/2012 | ............... G03G 9/08 |
| WO | 2012165639 | * | 12/2012 | ............... G03G 9/08 |
| WO | 2013/081172 | * | 6/2013 | ............... G03G 9/08 |

OTHER PUBLICATIONS

Machine English language translation of 2012165637 dated Dec. 6, 2012.*
Machine English language translation of 2012165639 dated Dec. 6, 2012.*
Kosaki, et al., U.S. Appl. No. 14,973,521, filed Dec. 17, 2015.

* cited by examiner

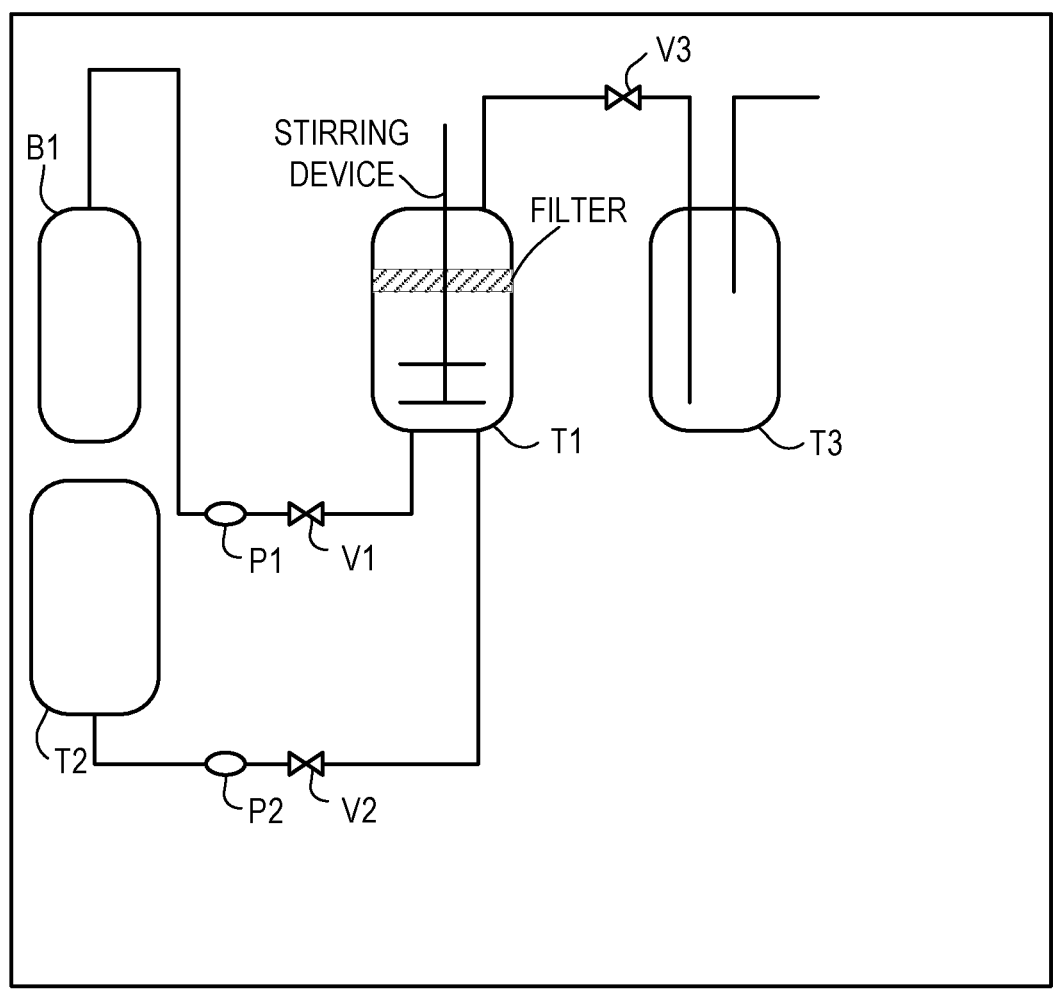

METHOD OF PRODUCING TONER

BACKGROUND OF THE INVENTION

Field of the Invention

The present invention relates to a resin fine particle and a method of producing a resin particle including using the resin fine particle, and more particularly, to a method of producing a toner to be used in a recording method involving utilizing an electrophotographic method, an electrostatic recording method, and a toner jet type recording method.

Description of the Related Art

Resin particles have been utilized as powder having a high function in a wide variety of fields, and monodisperse resin particles having a narrow particle size distribution have been required in many cases in order to control the function. Particularly in the field of electrophotography, the particles of a toner forming an image need to have uniform performance because the particles has a significant influence on an improvement in quality of the image. To that end, the uniformization of the particle diameters of the toner particles to sharpen their particle size distribution and the suppression of the occurrence of a deformed particle having a low circularity are effective.

A "dissolution suspension method" has been known as a production method capable of easily achieving the sharpening of the particle size distribution of the toner particles and increases in their circularities. The dissolution suspension method is a method involving dispersing a resin solution, which is obtained by dissolving a resin in an organic solvent in advance, in a dispersion medium to form droplets of the resin solution, and then removing the organic solvent to provide the toner particles.

In the dissolution suspension method, an aqueous medium is generally used as the dispersion medium. However, when the aqueous medium is used, large amounts of energy and time are required in a washing step and a drying step after the formation of the particles. Accordingly, in recent years, a method of producing a toner involving using carbon dioxide as a dispersion medium has been proposed.

In the method, toner particles are obtained by performing, after a droplet-forming step of forming a dispersion of droplets based on a resin solution in carbon dioxide in a liquid or supercritical state, a desolvating step of further introducing carbon dioxide to extract and remove an organic solvent in the droplets. According to the method, the resultant toner particles can be easily separated from carbon dioxide serving as the dispersion medium by depressurization after the desolvating step. Accordingly, a washing step and a drying step are not required, and hence the toner can be produced with low energy and at a low cost.

In the production of the toner by the dissolution suspension method involving using carbon dioxide as the dispersion medium, a dispersant needs to be used in the droplet-forming step for achieving the sharpening of the particle size distribution of the toner and an increase in its circularity. The dispersant plays the following role. The dispersant covers the surfaces of the droplets of the resin solution to suppress the agglomeration and sedimentation of the droplets, thereby stably dispersing the droplets, and the dispersant maintains their dispersed states till the end of the desolvating step. Therefore, the selection of the dispersant is extremely important.

In Japanese Patent Application Laid-Open No. 2009-052005 and Japanese Patent Application Laid-Open No. 2010-132851, there is proposed a method of producing a resin particle involving utilizing carbon dioxide in a liquid or supercritical state as a dispersion medium and using a resin fine particle as a dispersant. In Japanese Patent Application Laid-Open No. 2009-052005, a resin fine particle formed of behenyl acrylate and a methacryl-modified silicone is used.

In Japanese Patent Application Laid-Open No. 2010-132851, a crystalline resin fine particle made of, for example, a polyester or a behenyl acrylate copolymer is used.

In Japanese Patent Application Laid-Open No. 2013-137535, there is proposed a toner produced by using a resin fine particle containing a resin having a graft type structure constituted of a moiety having an organic polysiloxane structure and a moiety having an aliphatic polyester structure in a dispersion medium containing carbon dioxide.

According to the method, toner particles having a satisfactory particle size distribution can be obtained under a temperature as low as about 25° C. because the resin fine particle has a structure having affinities for both carbon dioxide and a resin solution.

SUMMARY OF THE INVENTION

However, the inventors of the present invention have investigated the production of a toner based on Japanese Patent Application Laid-Open No. 2009-052005, and as a result, have found that resin particles having a satisfactory particle size distribution are not necessarily obtained. The inventors have investigated a cause for the foregoing, and as a result, have considered that the resin fine particle used in the approach has a weak affinity for a resin solution and cannot maintain the dispersion stability, and hence a satisfactory particle size distribution is not obtained.

In addition, the inventors of the present invention have investigated the production of a toner based on Japanese Patent Application Laid-Open No. 2010-132851, and as a result, have found that toner particles having a satisfactory particle size distribution are not necessarily obtained. The inventors have investigated a cause for the foregoing, and as a result, have considered that the resin fine particle used in the approach has a weak affinity for carbon dioxide serving as the dispersion medium and cannot maintain the dispersion stability, and hence a satisfactory particle size distribution is not obtained.

In addition, the inventors have formed droplets with reference to Japanese Patent Application Laid-Open No. 2013-137535 while heating the resin solution to reduce its viscosity for the purpose of additionally improving the particle size distribution, and as a result, have found that contrary to expectations, toner particles having a satisfactory particle size distribution are not obtained. The inventors have investigated a cause for the foregoing, and as a result, have found that the used resin fine particle is deficient in resistance to an organic solvent at high temperature.

As is understood from the foregoing, there still remain problems to be solved for obtaining a toner having a sharp particle size distribution and a high circularity in a method of producing a resin particle involving using a resin fine particle as a dispersant and using carbon dioxide as a dispersion medium.

The present invention has been made in view of such problems as described above, and the present invention is directed to providing a resin fine particle that is available at a low cost and is used for obtaining resin particles and a toner having sharp particle size distributions and high circularities. Another object of the present invention is to provide methods of producing a resin particle and a toner each involving using the resin fine particle.

According to one aspect of the present invention, there is provided a method of producing a toner including a toner particle, the method comprising the steps of:

(e) mixing a resin R, a colorant, and an organic solvent to prepare a resin solution;

(f) mixing the resin solution, a resin fine particle, and carbon dioxide in a pressure container to form such a dispersion that a droplet of the resin solution having a surface covered with the resin fine particle is dispersed in a dispersion medium comprising the carbon dioxide;

(g) introducing carbon dioxide in a liquid state into the pressure container and pressurizing the pressure container to extract the organic solvent in the droplet into the dispersion medium; and (h) removing the organic solvent extracted into the dispersion medium from an inside of the pressure container together with the carbon dioxide to provide a toner particle, wherein the resin fine particle comprises a resin S containing an element α, and the resin fine particle satisfies the following formulae (1) and (2):

$$3.0 \leq A \leq 6.0 \quad (1)$$

$$1.10 \leq B/A \leq 1.55 \quad (2)$$

in the formulae (1) and (2),

"A" represents an amount (atomic %) of the element α of the resin fine particle measured by X-ray photoelectron spectroscopy (ESCA), and "B" represents an amount (atomic %) of the element α of a treated resin fine particle measured by the X-ray photoelectron spectroscopy, the treated resin fine particle being obtained by loading a dispersion obtained by dispersing the resin fine particle in the organic solvent into the pressure container, introducing carbon dioxide into the pressure container, and flowing carbon dioxide through the pressure container while maintaining a pressure in the pressure container at 6.5 MPa and a temperature in the pressure container at 25° C. to remove the organic solvent from the dispersion.

According to another aspect of the present invention, there is provided a method of producing a resin particle, comprising the steps of:

(a) mixing a resin R and an organic solvent to prepare a resin solution;

(b) mixing the resin solution, a resin fine particle, and carbon dioxide in a pressure container to form such a dispersion that a droplet of the resin solution having a surface covered with the resin fine particle is dispersed in a dispersion medium comprising the carbon dioxide;

(c) introducing carbon dioxide in a liquid state into the pressure container and pressurizing the pressure container to extract the organic solvent in the droplet into the dispersion medium; and (d) removing the organic solvent extracted into the dispersion medium from an inside of the pressure container together with the carbon dioxide to provide the resin particle, wherein the resin fine particle comprises a resin S containing an element α, and the resin fine particle satisfies the formulae (1) and (2).

According to further aspect of the present invention, there is provided a resin fine particle, including a resin S containing an element α, the resin fine particle satisfying the formulae (1) and (2).

According to the aspects of the present invention, the resin fine particle that is available at a low cost and is used for obtaining resin particles and a toner having sharp particle size distributions and high circularities can be provided. Further, the methods of producing a resin particle and a toner each involving using the resin fine particle can be provided.

Further features of the present invention will become apparent from the following description of exemplary embodiments with reference to the attached drawing.

BRIEF DESCRIPTION OF THE DRAWING

FIGURE is a view for illustrating an example of a production apparatus to be used in the production of a resin particle and a toner of the present invention.

DESCRIPTION OF THE EMBODIMENTS

Preferred embodiments of the present invention will now be described in detail in accordance with the accompanying drawing.

The production of a resin particle by a dissolution suspension method involving using carbon dioxide as a dispersion medium serving as a feature of the present invention is performed in accordance with the following steps (a) to (d):

(a) the step of mixing a resin R and an organic solvent to prepare a resin solution;

(b) the step of mixing the resin solution, a resin fine particle, and carbon dioxide in a pressure container to form such a dispersion that a droplet of the resin solution having a surface covered with the resin fine particle is dispersed in a dispersion medium containing the carbon dioxide;

(c) the step of introducing carbon dioxide in a liquid state into the pressure container and pressurizing the pressure container to extract the organic solvent in the droplet into the dispersion medium; and (d) the step of removing the organic solvent extracted into the dispersion medium from an inside of the pressure container together with the carbon dioxide to provide the resin particle.

The carbon dioxide serving as the dispersion medium to be used in the method of producing a resin particle of the present invention is carbon dioxide in a liquid or supercritical state. The carbon dioxide may be used alone, or may contain an organic solvent as any other component.

Details about the respective steps (a) to (d) in the production method of the present invention are demonstrated and described below.

In the step (a), first, the resin R and an organic solvent capable of dissolving the resin R are mixed. Then, a resin solution is prepared by homogeneously dissolving the resin with a dispersing machine, such as a homogenizer, a ball mill, a colloid mill, or an ultrasonic dispersing machine.

Examples of the organic solvent include: ketone-based solvents, such as acetone, methyl ethyl ketone, methyl isobutyl ketone, and di-n-butyl ketone; ester-based solvents, such as ethyl acetate, butyl acetate, and methoxybutyl acetate; ether-based solvents, such as tetrahydrofuran, dioxane, ethyl cellosolve, and butyl cellosolve; amide-based solvents, such as dimethylformamide and dimethylacetamide; and aromatic hydrocarbon-based solvents, such as toluene, xylene, and ethylbenzene.

In the step (b), the resin solution, the resin fine particle serving as a dispersant, and the carbon dioxide serving as the dispersion medium are loaded into a pressure container provided with a stirring unit, and these materials are mixed by stirring the inside of the pressure container with the stirring unit. Thus, such a dispersion that a droplet of the resin solution having a surface covered with the resin fine particle is dispersed in the dispersion medium containing the carbon dioxide is formed.

Examples of a method of forming the dispersion of the droplet include the following methods:
(1) a method involving loading a mixture obtained by mixing the resin solution and the resin fine particle in advance into the pressure container, and then adding the carbon dioxide under a state in which the mixture is stirred with the stirring unit;
(2) a method involving loading the resin solution into the pressure container, and then adding a product obtained by dispersing the resin fine particle in the carbon dioxide in advance under a state in which the resin solution is stirred with the stirring unit;
(3) a method involving loading the carbon dioxide into the pressure container, and then adding a mixture obtained by mixing the resin solution and the resin fine particle in advance under a state in which the carbon dioxide is stirred with the stirring unit; and
(4) a method involving loading a product obtained by dispersing the resin fine particle in the carbon dioxide in advance into the pressure container, and then adding the resin solution under a state in which the product is stirred with the stirring unit.

In a method involving loading the carbon dioxide into the pressure container in advance like the methods (3) and (4), the resin solution or the mixture of the resin solution and the resin fine particle can be introduced with a high-pressure pump.

In the step (b), a dispersed phase based on the droplet of the resin solution and a continuous phase based on the carbon dioxide serving as the dispersion medium are formed. At this time, part of the organic solvent in the droplet is extracted into the carbon dioxide, and hence the dispersion medium is constituted of the carbon dioxide and the organic solvent. In addition, the composition of the dispersion medium is affected by the amount of the carbon dioxide to be introduced, i.e., a pressure in the pressure container.

In order to stably form the droplet, the pressure in the pressure container is preferably 1.5 MPa or more and 6.0 MPa or less. The pressure can be controlled by adjusting the amount of the carbon dioxide to be introduced. When the pressure in the pressure container is 1.5 MPa or more, phase separation between the dispersed phase and the continuous phase can easily occur, and hence the ease with which the droplet is formed improves. Meanwhile, when the pressure is 6.0 MPa or less, an excessive increase in amount of the organic solvent to be extracted from the inside of the resin solution toward the dispersion medium is suppressed, and hence an additionally uniform droplet can be formed.

In the step (c), carbon dioxide in a liquid state is introduced into the pressure container to pressurize the container. Thus, the organic solvent in the droplet is extracted into the dispersion medium.

The pressure in the pressure container, which only needs to be made higher than the pressure in the step (b), is preferably made higher than that in the step (b) by 1.0 MPa or more in order to efficiently extract the organic solvent in the droplet into the dispersion medium. On the other hand, an upper limit for the pressure, which is not particularly limited, is set to preferably 20.0 MPa or less, more preferably 15.0 MPa or less from an industrial viewpoint. The pressure can be controlled by the amount of the carbon dioxide in a liquid state to be introduced, and the introduction of the carbon dioxide can be performed with a high-pressure pump.

In the step (d), the resin particle is obtained by performing the removal of the organic solvent extracted into the dispersion medium from the pressure container, i.e., the so-called desolvation.

Examples of a method of removing the organic solvent extracted into the dispersion medium include the following methods:
(1) a method involving pressurizing the inside of the pressure container with the carbon dioxide in a liquid state and then further flowing carbon dioxide, while keeping the pressure in the pressure container constant, to purge the container with the carbon dioxide; and
(2) a method involving pressurizing the inside of the pressure container with the carbon dioxide in a liquid state, then opening the pressure container once to depressurize the container, and repeatedly performing the operations of the pressurization and the depressurization to purge the container with the carbon dioxide.

When the purging with the carbon dioxide is not sufficient and the organic solvent is in a state of remaining in the dispersion, upon recovery of the resultant resin particles, the resin particles re-dissolve or the resin particles coalesce in some cases.

Therefore, the purging with the carbon dioxide is preferably performed until the organic solvent is completely removed. The amount of the carbon dioxide to be used is preferably 1 times or more and 100 times or less, more preferably 1 times or more and 50 times or less, still more preferably 1 times or more and 30 times or less as large as the volume of the dispersion.

The inside of the pressure container only needs to be depressurized upon removal of the resin particle from the dispersion. At this time, the container may be depressurized to normal temperature and normal pressure in one stroke, or the depressurization may be performed in a stepwise manner by arranging a plurality of containers whose pressures have been independently controlled. A depressurization rate is preferably set to fall within such a range that the resin particle does not foam. It should be noted that the organic solvent and carbon dioxide to be used in the present invention can be recycled.

The production of a toner by the dissolution suspension method involving using carbon dioxide as a dispersion medium serving as a feature of the present invention is performed in accordance with the following steps (e) to (h):
(e) the step of mixing a resin R, a colorant, and an organic solvent to prepare a resin solution;
(f) the step of mixing the resin solution, a resin fine particle, and carbon dioxide in a pressure container to form such a dispersion that a droplet containing the resin solution having a surface covered with the resin fine particle is dispersed in a dispersion medium containing the carbon dioxide;
(g) the step of introducing carbon dioxide in a liquid state into the pressure container and pressurizing the pressure container to extract the organic solvent in the droplet into the dispersion medium; and (h) the step of removing the organic solvent extracted into the dispersion medium from the inside of the pressure container together with the carbon dioxide to provide a toner particle.

The carbon dioxide serving as the dispersion medium to be used in the method of producing a toner of the present invention is carbon dioxide in a liquid or supercritical state. The carbon dioxide may be used alone, or may contain an organic solvent as any other component. Details about the step (e) in the production method of the present invention are demonstrated and described below.

In the step (e), first, the resin R and the colorant, an organic solvent capable of dissolving the resin R, and as required, a wax and any other additive are mixed. Then, a resin solution is prepared in the same manner as in the step (a).

Examples of the organic solvent include the same examples as those in the step (a).

The step (f), the step (g), and the step (h) are performed in the same manner as in the step (b), the step (c), and the step (d), respectively.

The steps (c) and (g) in the methods of producing a resin particle and a toner of the present invention are each the step of further introducing the carbon dioxide into the pressure container and pressurizing the container to actively extract the organic solvent in the droplet into the dispersion medium in order to efficiently perform the desolvation in each of the steps (d) and (h). Therefore, in steps subsequent to the steps (c) and (g), both the compositions of the dispersed phase and the continuous phase fluctuate as compared to those in the steps (b) and (f).

Such fluctuation of the dispersed phase and the continuous phase between a droplet-forming step and a desolvating step is a large difference that has not needed to be particularly taken into consideration in a conventional dissolution suspension method involving using an aqueous medium as a dispersion medium in which the production is performed at around atmospheric pressure from beginning to end.

The inventors of the present invention have paid attention to the point, and have made detailed investigations on a change in composition of each of the dispersed phase and the continuous phase between the respective steps. As a result, the inventors have revealed that in particular, the solubility parameter (SP value) of the continuous phase largely fluctuates.

Then, the inventors have considered problems in the production of a resin particle and a toner by the dissolution suspension method involving using carbon dioxide as a dispersion medium anew based on the finding. As a result, the inventors have reached the conclusion that resin particles and a toner having sharp particle size distributions cannot be necessarily obtained merely by appropriately adjusting the resin composition of a resin fine particle used in the conventional dissolution suspension method based on an aqueous medium and applying the adjusted composition to the dissolution suspension method involving using carbon dioxide as a dispersion medium.

Suppose, for example, that the composition (SP value) of a resin constituting the resin fine particle is designed so that the resin fine particle may be placed at an interface between the dispersed phase and the continuous phase in the droplet-forming step. In the desolvating step, however, the resin fine particle may be embedded toward the dispersed phase or may be liberated toward the continuous phase in association with a fluctuation in SP value of the continuous phase. In such case, it is assumed that the dispersion stability of the droplet is impaired, and hence the agglomeration of the droplets occurs to reduce the particle size distributions of the resin particles and toner particles to be obtained.

Therefore, such sophisticated design that the dispersion stability of the droplet can be sustained even after the fluctuation in SP value of the continuous phase is required for the resin fine particle to be used in the dissolution suspension method involving using carbon dioxide as a dispersion medium.

In view of the foregoing, the inventors of the present invention have considered introducing a moiety having an affinity for the continuous phase into the resin constituting the resin fine particle and causing the moiety to hold molecular mobility. The inventors have considered that when such a function that the surface composition of the resin fine particle changes following the fluctuation in SP value of the continuous phase can be imparted by doing the foregoing, the problems described in the foregoing can be solved.

In the methods of producing a resin particle and a toner of the present invention, a resin fine particle containing a resin S containing an element α is used as the moiety having an affinity for the continuous phase.

The analysis of the surface composition of the resin fine particle can be performed by determining the amount of the element α in the resin S through the use of X-ray photoelectron spectroscopy (ESCA).

A moiety having an organic polysiloxane structure (hereinafter sometimes referred to as "organic polysiloxane group") can be given as a preferred example of the moiety having an affinity for the continuous phase based on the dispersion medium containing carbon dioxide.

The organic polysiloxane group is a group of low polarity having a structure having a repeating unit of a Si—O bond represented by the following formula (11) and having two alkyl groups bonded to each Si element.

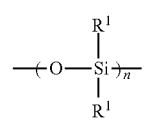

Formula (11)

That is, the organic polysiloxane group contains Si as the element α. In the formula (11), $R^1$ represents an alkyl group, and n represents a polymerization degree and represents an integer of 2 or more.

The Si—O bond is rich in flexibility because the bond has a bond distance longer than that of a C—C bond. Accordingly, when the organic polysiloxane group is introduced into the resin S constituting the resin fine particle, the organic polysiloxane group present on the surface of the resin fine particle orients toward the continuous phase. Thus, the so-called "excluded volume effect" by which the agglomeration due to collision between the droplets of the resin solution serving as the dispersed phase is inhibited can be expressed.

The inventors of the present invention have produced a resin fine particle by using the resin S having introduced thereinto the organic polysiloxane group. Then, the inventors have subjected the resin fine particle to an exposure treatment with carbon dioxide in a liquid state, and have investigated a change in surface composition of the resin fine particle after the treatment as compared to the surface composition before the treatment.

Herein, the exposure treatment is specifically a treatment performed in accordance with the following procedure:
(1) a dispersion is prepared by dispersing the resin fine particle in the organic solvent;
(2) the dispersion is loaded into a pressure container and carbon dioxide is introduced into the container under a temperature of 25° C. until a pressure in the container reaches 6.5 MPa; and
(3) the organic solvent is removed from the dispersion by flowing the carbon dioxide through the pressure container under a state in which the temperature and pressure in the pressure container are maintained at 25° C. and 6.5 MPa, respectively.

In the ESCA, an element present on the surface of a sample (region having a depth of up to about 10 nm) is detected. In addition, the bonding states of elements can be separated from each other by a chemical shift, and in the case of the Si—O bond derived from the organic polysiloxane group, a peak appears at 101 eV or more and 103 eV or less.

As a result of their investigation, the inventors have found that the extent to which the surface composition of the resin fine particle changes after the exposure treatment as compared to that before the treatment can be controlled by adjusting the manner in which the organic polysiloxane group is introduced and its molecular chain length.

Further, the inventors have found that followability to the fluctuation in SP value of the continuous phase can be imparted to the resin fine particle by setting the extent to which the surface composition changes within a specific range, and hence the sharpening of the particle size distributions of the resin particles and toner particles to be obtained, and increases in their circularities can be achieved. Thus, the inventors have reached the present invention.

Details about the extent to which the surface composition changes required for the resin fine particle to exhibit the followability to the fluctuation in SP value of the continuous phase and requirements for achieving the extent are described below.

When the amount of the element α of the resin fine particle measured by the ESCA is represented by A (atomic %), the amount A of the α satisfies the following formula (1).

$$3.0 \leq A \leq 6.0 \quad (1)$$

A value for the A of less than 3.0 atomic % means that the moiety containing the element α functioning as a group having an affinity for carbon dioxide serving as a dispersion medium is deficient in the surface of the resin fine particle. In addition, the function as a dispersant reduces and hence the dispersion stability of the droplet reduces. In addition, a value for the amount A of more than 6.0 atomic % means that the amount of the moiety containing the element α present on the surface of the resin fine particle is excessively large, and hence the affinity for the droplet of the resin solution reduces. Accordingly, the dispersion stability of the droplet reduces.

Therefore, the value for the A is preferably 3.5 atomic % or more and 5.5 atomic % or less.

In addition, the amount of the element α of a treated resin fine particle, which is obtained by subjecting the resin fine particle to the exposure treatment with carbon dioxide in a liquid state, measured by the ESCA is represented by B (atomic %). At that time, the extent to which the surface composition changes by the exposure treatment is represented by a ratio B/A of the amount B of the α to the amount A of the α, and satisfies the following formula (2).

$$1.10 \leq B/A \leq 1.55 \quad (2)$$

A value for the B/A of less than 1.10 means that the followability to the fluctuation in SP value of the continuous phase is low, and hence it is difficult to sustain the dispersion stability of the droplet. In addition, a value for the B/A of more than 1.55 is originally advantageous in terms of the followability to the fluctuation in SP value of the continuous phase, but causes the following new problem: the solvent resistance of the resin reduces. As a result, particularly when droplet formation is performed at high temperature, the dispersion stability of the droplet reduces.

Therefore, the value for the B/A is preferably 1.15 or more and 1.45 or less.

The resin S constituting the resin fine particle to be used in the methods of producing a resin particle and a toner of the present invention is preferably a resin of a molecular structure having, on a side chain thereof, a moiety having an organic polysiloxane structure.

The excluded volume effect of the moiety having an organic polysiloxane structure needs to be maintained by changing its oriented state following a change in composition of the continuous phase after the steps (c) and (g). The flexibility of the moiety having an organic polysiloxane structure becomes higher in the case where the moiety has such a structure that one terminal thereof is bonded to the resin than in the case where the moiety has such a structure that both terminals thereof are bonded to the resin. Therefore, the resin preferably adopts a molecular structure having such a side chain structure that one terminal of the moiety is bonded.

The weight average molecular weight (Mw) of the moiety having an organic polysiloxane structure in the methods of producing a resin particle and a toner of the present invention is preferably 400 or more and 2,000 or less.

Herein, the Mw of the moiety having an organic polysiloxane structure represents the length of the side chain. When a value for the Mw falls within the range, the dispersion stability of the droplet in the steps subsequent to the steps (c) and (g) improves, and hence the sharpening of the particle size distributions of the resin particles and the toner particles, and increases in their circularities can be achieved.

When the value for the Mw is 400 or more, the spread when the side chain having an organic polysiloxane structure orients toward the continuous phase enlarges, and hence a sufficient excluded volume effect can be easily obtained. Further, the followability to the fluctuation in SP value of the continuous phase improves, and hence the dispersion stability of the droplet improves particularly in the steps subsequent to the steps (c) and (g). In addition, when the value for the Mw is 2,000 or less, the side chain having an organic polysiloxane structure is prevented from becoming excessively long, and hence the solvent resistance of the resin improves and the stability of the droplet becomes higher.

The resin S constituting the resin fine particle to be used in the methods of producing a resin particle and a toner of the present invention is preferably a resin having a crosslinked structure.

When the crosslinked structure is introduced into the resin S constituting the resin fine particle, the value for the B/A representing the extent to which the surface Si composition changes when the resin fine particle is subjected to the exposure treatment with carbon dioxide can be easily set to fall within the range represented by the formula (2).

The introduction of the crosslinked structure additionally suppresses a reduction in solvent resistance under high temperature even when the side chain having an organic polysiloxane structure is lengthened. As a result, the dispersion stability of the droplet improves.

With regard to the particle diameters of the resin fine particles, their number average particle diameter is preferably 30 nm or more and 300 nm or less, more preferably 50 nm or more and 250 nm or less. When the particle diameter of the resin fine particles is 30 nm or more, the stability of the droplet in the steps (b) and (f) tends to improve. When the particle diameter is 300 nm or less, the particle diameter of the droplet can be easily controlled to a desired size. The blending amount of the resin fine particles is preferably 3.0 parts by mass or more and 15.0 parts by mass or less with respect to the solid matter in the resin solution, and can be appropriately adjusted in accordance with the stability of the droplet and the desired particle diameter.

In the method of producing a toner of the present invention, any one of a crystalline resin and an amorphous resin each of which is a resin to be generally used in a toner can be used as the resin R; a resin containing a polyester as a main component is particularly preferably used. The crystalline resin means a resin having a structure in which the molecular chains of polymers are regularly arrayed. Therefore, the resin is substantially free from softening in a temperature region lower than its melting point, but at a temperature exceeding the melting point, its melting occurs and hence the resin abruptly softens. Such resin shows a clear melting point peak in differential scanning calorimetry with a differential scanning calorimeter (DSC). Therefore, the viscosity of the crystalline resin reduces after the melting and hence satisfactory low-temperature fixability of the toner can be easily expressed.

The melting point of the crystalline resin is preferably 50° C. or more and 90° C. or less.

Examples of the crystalline resin that can be used for the resin R include a crystalline polyester resin, a crystalline polyvinyl resin, a crystalline polyurethane resin, and a crystalline polyurea resin. Of those, a crystalline polyester resin or a crystalline polyvinyl resin is preferred, and a crystalline polyester resin is particularly preferred.

The crystalline polyester resin is preferably a resin obtained by causing an aliphatic diol and an aliphatic dicarboxylic acid to react with each other, and is more preferably a resin obtained by causing an aliphatic diol having 2 to 20 carbon atoms and an aliphatic dicarboxylic acid having 2 to 18 carbon atoms to react with each other.

In addition, the aliphatic diol is preferably linear. When the diol is linear, a polyester having additionally high crystallinity is obtained.

Examples of the linear aliphatic diol having 2 to 20 carbon atoms include the following compounds.

1,2-Ethanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol.

Of those, 1,4-butanediol, 1,5-pentanediol, 1,6-hexanediol, 1,7-heptanediol, 1,8-octanediol, 1,9-nonanediol, and 1,10-decanediol are more preferred from the viewpoint of a melting point. One kind of those compounds may be used alone, or two or more kinds thereof may be used as a mixture.

In addition, an aliphatic diol having a double bond can also be used. Examples of the aliphatic diol having a double bond can include the following compounds: 2-butene-1,4-diol, 3-hexene-1,6-diol, and 4-octene-1,8-diol.

In addition, the aliphatic dicarboxylic acid is particularly preferably a linear aliphatic dicarboxylic acid from the viewpoint of crystallinity.

Examples of the linear aliphatic dicarboxylic acid having 2 to 18 carbon atoms can include the following compounds.

Oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid, and lower alkyl esters and acid anhydrides thereof.

Of those, sebacic acid, adipic acid, and 1,10-decanedicarboxylic acid, and lower alkyl esters and acid anhydrides thereof are preferred. One kind of those compounds may be used alone, or two or more kinds thereof may be used as a mixture.

In addition, an aromatic carboxylic acid can also be used. Examples of the aromatic dicarboxylic acid can include terephthalic acid, isophthalic acid, 2,6-naphthalenedicarboxylic acid, and 4,4'-biphenyldicarboxylic acid.

Of those, terephthalic acid is preferred because of the ease of availability and the ease with which a polymer having a low boiling point is formed.

In addition, a dicarboxylic acid having a double bond can be used. The dicarboxylic acid having a double bond can be suitably used for preventing the hot offset at the time of its fixation because the entirety of the resin can be crosslinked by utilizing the double bond.

Examples of such dicarboxylic acid include fumaric acid, maleic acid, 3-hexenedioic acid, and 3-octenedioic acid, and lower alkyl esters and acid anhydrides thereof. Of those, fumaric acid and maleic acid are more preferred from the viewpoint of cost.

A method of producing the crystalline polyester resin is not particularly limited, and the polyester resin can be produced by a general polyester resin polymerization method involving causing a carboxylic acid component and an alcohol component to react with each other. For example, the polyester resin can be produced by properly using a direct polycondensation method and an ester exchange method depending on the kinds of the monomers.

The production of the crystalline polyester resin is preferably performed at a polymerization temperature of 180° C. or more and 230° C. or less, and the monomers are preferably caused to react with each other under a state in which a pressure in a reaction system is reduced as required while water and an alcohol to be produced at the time of condensation are removed. When the monomers do not dissolve or are not compatible with each other under the reaction temperature, a high-boiling point organic solvent is desirably added as a solubilizing aid to dissolve the monomers. A polycondensation reaction is performed while the organic solvent serving as a solubilizing aid is distilled off. When a monomer having poor compatibility is present in a polymerization reaction, the monomer having poor compatibility and an acid or alcohol to be subjected to polycondensation with the monomer are preferably condensed in advance before being subjected to the polycondensation together with a main component.

Examples of the catalyst that can be used in producing the crystalline polyester resin can include the following compounds: titanium catalysts, such as titanium tetraethoxide, titanium tetrapropoxide, titanium tetraisopropoxide, and titanium tetrabutoxide; and tin catalysts, such as dibutyltin dichloride, dibutyltin oxide, and diphenyltin oxide.

The crystalline polyvinyl resin is, for example, a resin obtained by polymerizing a vinyl-based monomer having a linear alkyl group in its molecular structure.

The vinyl-based monomer having a linear alkyl group in its molecular structure is preferably an alkyl acrylate or alkyl methacrylate whose alkyl group has 12 or more carbon atoms. Examples thereof can include the following compounds: lauryl acrylate, lauryl methacrylate, myristyl acrylate, myristyl methacrylate, cetyl acrylate, cetyl methacrylate, stearyl acrylate, stearyl methacrylate, eicosyl acrylate, eicosyl methacrylate, behenyl acrylate, and behenyl methacrylate.

With regard to a method of producing the crystalline polyvinyl resin, the polymerization is preferably performed at a temperature of 40° C. or more, or in general, 50° C. or more and 90° C. or less.

The amorphous resin does not show any clear highest endothermic peak in differential scanning calorimetry. It should be noted that the glass transition point (Tg) of the amorphous resin is preferably 50° C. or more and 130° C. or less, more preferably 55° C. or more and 110° C. or less.

Specific examples of the amorphous resin include an amorphous polyester resin, an amorphous polyurethane resin, an amorphous polyvinyl resin, and an amorphous polyurea resin. In addition, those resins may each be modified with urethane, urea, or epoxy. Of those, an amorphous polyester resin, an amorphous polyvinyl resin, and an amorphous polyurethane resin are preferred, and an amorphous polyester resin is particularly preferred, from the viewpoint of elasticity maintenance.

The amorphous polyester resin is described below. Monomers that can be used in the production of the amorphous polyester resin are, for example, a conventionally known carboxylic acid that is divalent or trivalent or more, and a conventionally known alcohol that is dihydric or trihydric or more. Specific examples of those monomers include the following compounds.

Examples of the divalent carboxylic acid can include the following compounds: dibasic acids, such as succinic acid, adipic acid, sebacic acid, phthalic acid, isophthalic acid, terephthalic acid, malonic acid, dodecenylsuccinic acid, and anhydrides or lower alkyl esters thereof; and aliphatic unsaturated dicarboxylic acids, such as maleic acid, fumaric acid, itaconic acid, and citraconic acid.

In addition, examples of the trivalent or more carboxylic acid can include the following compounds: 1,2,4-benzenetricarboxylic acid, 1,2,5-benzenetricarboxylic acid, and anhydrides or lower alkyl esters thereof. One kind of those carboxylic acids may be used alone, or two or more kinds thereof may be used in combination.

Examples of the dihydric alcohol can include the following compounds: alkylene glycols (ethylene glycol, 1,2-propylene glycol, and 1,3-propylene glycol); alkylene ether glycols (polyethylene glycol and polypropylene glycol); an alicyclic diol (1,4-cyclohexanedimethanol); a bisphenol (bisphenol A); and alkylene oxide (ethylene oxide and propylene oxide) adducts of an alicyclic diol.

An alkyl moiety of each of the alkylene glycol and alkylene ether glycol may be linear or branched. In the present invention, the alkylene glycol having a branched structure can also be preferably used.

In addition, examples of the trihydric or more alcohol can include the following compounds: glycerin, trimethylolethane, trimethylolpropane, and pentaerythritol. One kind of those alcohols may be used alone, or two or more kinds thereof may be used in combination.

It should be noted that monovalent acids, such as acetic acid and benzoic acid, and monohydric alcohols, such as cyclohexanol and benzyl alcohol, can also each be used as required for the purpose of adjusting the acid value or hydroxyl value.

A method of synthesizing the amorphous polyester resin is not particularly limited, but for example, an ester exchange method and a direct polycondensation method can each be used alone, or can be used in combination.

Next, the amorphous polyurethane resin is described. The polyurethane resin is a product of a reaction between a diol and a compound having a diisocyanate group, and a resin having various kinds of functionality can be obtained by adjusting the diol and the diisocyanate.

The same diisocyanate as that can be used in the production of the polyester having a polymerizable unsaturated group can be used as the diisocyanate.

In addition, an isocyanate compound that is trifunctional or more as well as the diisocyanate can be used.

The same alcohol as the dihydric alcohol that can be used in the production of the amorphous polyester resin can be adopted as the diol.

The amorphous vinyl resin is described below. The following compounds can be given as monomers that can be used in the production of the amorphous vinyl resin.

Aliphatic vinyl hydrocarbons: alkenes (ethylene, propylene, butene, isobutylene, pentene, heptene, diisobutylene, octene, dodecene, octadecene, and α-olefins except the olefins); and alkadienes (butadiene, isoprene, 1,4-pentadiene, 1,6-hexadiene, and 1,7-octadiene).

Alicyclic vinyl hydrocarbons: mono- or di-cycloalkenes and alkadienes (cyclohexene, cyclopentadiene, vinylcyclohexene, and ethylidenebicycloheptene); and terpenes (pinene, limonene, and indene).

Aromatic vinyl hydrocarbons: styrene and hydrocarbyl (alkyl, cycloalkyl, aralkyl, and/or alkenyl)-substituted products thereof (α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene); and vinylnaphthalene.

Carboxyl group-containing vinyl-based monomers and metal salts thereof: unsaturated monocarboxylic acids and unsaturated dicarboxylic acids each having 3 or more and 30 or less carbon atoms, and anhydrides thereof and monoalkyl (having 1 or more and 11 or less carbon atoms) esters thereof (carboxyl group-containing vinyl-based monomers, such as maleic acid, maleic anhydride, a maleic acid monoalkyl ester, fumaric acid, a fumaric acid monoalkyl ester, crotonic acid, itaconic acid, an itaconic acid monoalkyl ester, an itaconic acid glycol monoether, citraconic acid, a citraconic acid monoalkyl ester, and cinnamic acid).

Vinyl esters (vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl acrylate, phenyl methacrylate, vinyl methoxyacetate, vinyl benzoate, and ethyl α-ethoxyacrylate), alkyl acrylates and alkyl methacrylates each having a (linear or branched) alkyl group having 1 or more and 11 or less carbon atoms (methyl acrylate, methyl methacrylate, ethyl acrylate, ethyl methacrylate, propyl acrylate, propyl methacrylate, butyl acrylate, butyl methacrylate, 2-ethylhexyl acrylate, and 2-ethylhexyl methacrylate), a dialkyl fumarate (fumaric acid dialkyl ester) (two alkyl groups are linear, branched, or alicyclic groups each having 2 or more and 8 or less carbon atoms), a dialkyl maleate (maleic acid dialkyl ester) (two alkyl groups are linear, branched, or alicyclic groups each having 2 or more and 8 or less carbon atoms), polyallyloxyalkanes (diallyloxyethane, triallyloxyethane, tetraallyloxyethane, tetraallyloxypropane, tetraallyloxybutane, and tetramethallyloxyethane), vinyl-based monomers each having a polyalkylene glycol chain (polyethylene glycol (molecular weight: 300) monoacrylate, polyethylene glycol (molecular weight: 300) monomethacrylate, polypropylene glycol (molecular weight: 500) monoacrylate, polypropylene glycol (molecular weight: 500) monomethacrylate, methyl alcohol ethylene oxide (ethylene oxide is hereinafter abbreviated as EO) 10 mol adduct acrylate, methyl alcohol ethylene oxide (ethylene oxide is hereinafter abbreviated as EO) 10 mol adduct methacrylate, lauryl alcohol EO 30 mol adduct acrylate, and lauryl alcohol EO 30 mol adduct methacrylate), and polyacrylates and polymethacrylates (polyacrylates and polymethacrylates of polyhydric alcohols: ethylene glycol diacrylate, ethylene glycol dimethacrylate, propylene glycol diacrylate, propylene glycol dimethacrylate, neopentyl glycol diacrylate, neopentyl glycol dimethacrylate, trimethylolpropane triacrylate, trimethylolpropane trimethacrylate, polyethylene glycol diacrylate, and polyethylene glycol dimethacrylate).

Further, in the present invention, the use of a block polymer obtained by chemically bonding a crystalline resin component and an amorphous resin component as the resin R is also one preferred mode.

Examples of the block polymer include an XY type diblock polymer, an XYX type triblock polymer, a YXY type triblock polymer, and an XYXY . . . type multiblock polymer, where X represents the crystalline resin component and Y represents the amorphous resin component, and any one of these forms can be used.

The following methods can each be used as a method of preparing the block polymer: a method involving separately preparing a component forming a crystal portion formed of the crystalline resin component and a component forming an amorphous portion formed of the amorphous resin component, and bonding both the components (two-stage method); and a method involving simultaneously loading raw materials for the component forming the crystal portion and the component forming the amorphous portion to prepare the block polymer in one stage (one-stage method).

The block polymer can be prepared by a method selected from various methods in consideration of the reactivity of each of the terminal functional groups of the block polymer.

When both the crystalline resin component and the amorphous resin component are polyester resins, the block polymer can be prepared by separately preparing the respective components and then bonding the components with a binder as required. Particularly when one of the polyesters has a high acid value and the other polyester has a high hydroxyl value, the components can be bonded without the use of any binder. At this time, the reaction is preferably performed at a temperature around 200° C.

When the binder is used, examples thereof include the following binders: a polyvalent carboxylic acid, a polyhydric alcohol, a polyvalent isocyanate, a polyfunctional epoxy, and a polyvalent acid anhydride. The block polymer can be synthesized with any such binder by a dehydration reaction or an addition reaction.

On the other hand, when the crystalline resin component is a polyester resin and the amorphous resin component is a polyurethane resin, the block polymer can be prepared by separately preparing the respective components, and then subjecting an alcohol terminal of the polyester resin and an isocyanate terminal of the polyurethane resin to a urethanization reaction. In addition, the block polymer can be synthesized by mixing the polyester resin having an alcohol terminal, and a diol and diisocyanate constituting the polyurethane resin, and heating the mixture. At the initial stage of a reaction where diol and diisocyanate concentrations are high, the diol and the diisocyanate selectively react with each other to provide the polyurethane resin. After the molecular weight of the resin has increased to some extent, the urethanization reaction between the isocyanate terminal of the polyurethane resin and the alcohol terminal of the polyester resin occurs. Thus, the block polymer can be obtained.

When both the crystalline resin component and the amorphous resin component are vinyl resins, the block polymer can be prepared by polymerizing one of the components and then initiating the polymerization of the other component from a terminal of the resultant vinyl polymer.

The ratio of the crystalline resin component in the block polymer is preferably 50.0 mass % or more, more preferably 70.0 mass % or more.

The resin S constituting the resin fine particle in the method of producing a toner of the present invention is preferably a polymerized product of a monomer composition containing an organic polysiloxane compound having a vinyl group and a polyester having a polymerizable unsaturated group.

The organic polysiloxane compound having a vinyl group shows a high affinity for carbon dioxide serving as a dispersion medium and hence can exhibit an excluded volume effect. Meanwhile, the polyester having a polymerizable unsaturated group has a high affinity for the resin R containing a polyester and hence serves as a component that adsorbs to the droplet of the resin solution. In addition, when the average number of polymerizable unsaturated groups in one molecule of the polyester is more than 1.0, the polyester can also serve to form the crosslinked structure.

Therefore, the stability of the droplet can be additionally improved by using the resin fine particle, which is obtained by polymerizing the organic polysiloxane compound and the polyester having a polymerizable unsaturated group, as a dispersant. In addition, additional sharpening of the particle size distribution of the toner particles and additional increases in their circularities can be achieved.

An example of the structure of the organic polysiloxane compound having a vinyl group to be used in the polymerization of the resin S constituting the resin fine particle is represented by the formula (12). In the formula (12), $R^2$ and $R^3$ each represent an alkyl group, $R^4$ represents an alkylene group, $R^5$ represents a hydrogen atom or a methyl group, and n represents a polymerization degree and represents an integer of 2 or more.

Formula (12)

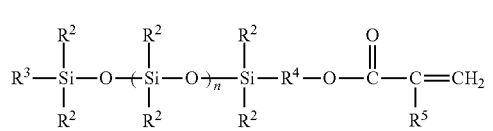

A method of synthesizing the organic polysiloxane compound having a vinyl group is, for example, a reaction based on a dehydrochlorination reaction between a carbinol-modified polysiloxane and acryloyl chloride or methacryloyl chloride.

The polyester having a polymerizable unsaturated group is preferably such that the average number of polymerizable unsaturated groups in one molecule of the polyester is 1.0 or more and 3.0 or less.

The average number of polymerizable unsaturated groups represents the degree of unsaturation of the polyester having a polymerizable unsaturated group. The crosslink density of the resin fine particle is determined by appropriately adjusting the degree of unsaturation of the polyester having a polymerizable unsaturated group. When the average number of polymerizable unsaturated groups is set to fall within the range, the value for the B/A can be easily set to fall within the range represented by the formula (2).

When the average number of polymerizable unsaturated groups is 3.0 or less, the crosslinking of the resin S constituting the resin fine particle is prevented from becoming excessive, the molecular mobility of the side chain having an organic polysiloxane structure improves, and hence the value for the B/A can be easily adjusted to fall within a proper range.

When the average number of polymerizable unsaturated groups is reduced from 3.0, the molecular mobility of the side chain improves. However, as the average number approaches 1.0, the solvent resistance against a dispersion medium tends to reduce. When the average number of polymerizable unsaturated groups is 1.0 or more, the crosslinked structure is formed and hence the value for the B/A can be easily adjusted to a proper value.

Further, the average number of polymerizable unsaturated groups is more preferably 1.5 or more and 2.5 or less.

Examples of a method of producing the polyester having a polymerizable unsaturated group include the following methods.

(1) A method involving introducing a polymerizable unsaturated group at the time of a polycondensation reaction between a dicarboxylic acid and a diol Examples of the method involving introducing a polymerizable unsaturated group include the following approaches.

(1-1) A method involving using a dicarboxylic acid having a polymerizable unsaturated group as part of the dicarboxylic acid (1-2) A method involving using a diol having a polymerizable unsaturated group as part of the diol (1-3) A method involving using a dicarboxylic acid having a polymerizable unsaturated group and a diol having a polymerizable unsaturated group as part of the dicarboxylic acid and part of the diol, respectively The degree of unsaturation of the polyester having a polymerizable unsaturated group can be adjusted by the addition amount of the dicarboxylic acid or diol having a polymerizable unsaturated group.

Examples of the dicarboxylic acid having a polymerizable unsaturated group include fumaric acid, maleic acid, 3-hexenedioic acid, and 3-octenedioic acid, and lower alkyl esters and acid anhydrides thereof. Of those, fumaric acid and maleic acid are more preferred from the viewpoint of cost. In addition, examples of the aliphatic diol having a polymerizable unsaturated group can include the following compounds: 2-butene-1,4-diol, 3-hexene-1,6-diol, and 4-octene-1,8-diol.

A dicarboxylic acid or diol to be used in ordinary polyester production to be described later can be used as a dicarboxylic acid or diol free of the polymerizable unsaturated group.

(2) A method involving coupling a polyester produced by polycondensation between a dicarboxylic acid and a diol, and a vinyl-based compound In the coupling, a vinyl-based compound containing a functional group capable of reacting with a terminal functional group of the polyester may be directly coupled. In addition, the coupling may be performed after a terminal of the polyester has been modified with a binder so as to be capable of reacting with the functional group contained in the vinyl-based compound. Examples thereof include the following methods.

(2-1) A coupling method involving subjecting a polyester having a carboxyl group at a terminal thereof and a vinyl-based compound having a hydroxyl group to a condensation reaction In this case, in the preparation of the polyester, the molar ratio (dicarboxylic acid/diol) of the dicarboxylic acid to the diol is preferably 1.02 or more and 1.20 or less.

(2-2) A coupling method involving subjecting a polyester having a hydroxyl group at a terminal thereof and a vinyl-based compound having an isocyanate group to a urethanization reaction (2-3) A coupling method involving subjecting a polyester having a hydroxyl group at a terminal thereof and a vinyl-based compound having a hydroxyl group to a urethanization reaction with a diisocyanate serving as a binder In the preparation of the polyester to be used in the method described in the item (2-2) or the item (2-3), the molar ratio (diol/dicarboxylic acid) of the diol to the dicarboxylic acid is preferably 1.02 or more and 1.20 or less.

Examples of the vinyl-based compound having a hydroxyl group include hydroxystyrene, N-methylolacrylamide, N-methylolmethacrylamide, hydroxyethyl acrylate, hydroxyethyl methacrylate, hydroxypropyl acrylate, hydroxypropyl methacrylate, polyethylene glycol monoacrylate, polyethylene glycol monomethacrylate, allyl alcohol, methallyl alcohol, crotyl alcohol, isocrotyl alcohol, 1-buten-3-ol, 2-buten-1-ol, 2-butene-1,4-diol, propargyl alcohol, 2-hydroxyethyl propenyl ether, and sucrose allyl ether. Of those, hydroxyethyl acrylate and hydroxyethyl methacrylate are preferred.

Examples of the vinyl-based compound having an isocyanate group include the following: 2-isocyanatoethyl acrylate, 2-isocyanatoethyl methacrylate, 2-(0-[1'-methylpropylideneamino]carboxyamino)ethyl methacrylate, 2-[(3,5-dimethylpyrazolyl)carbonylamino]ethyl methacrylate, and m-isopropenyl-α,α-dimethylbenzyl isocyanate. Of those, 2-isocyanatoethyl acrylate and 2-isocyanatoethyl methacrylate are particularly preferred.

Examples of the diisocyanate include the following: an aromatic diisocyanate having 6 or more and 20 or less carbon atoms (excluding a carbon atom in an NCO group, and the same holds true for the following), an aliphatic diisocyanate having 2 or more and 18 or less carbon atoms, an alicyclic diisocyanate having 4 or more and 15 or less carbon atoms, and modified products of these diisocyanates (modified products each containing a urethane group, a carbodiimide group, an allophanate group, a urea group, a biuret group, a uretdione group, a uretonimine group, an isocyanurate group, or an oxazolidone group, which are hereinafter sometimes referred to as modified diisocyanates).

Examples of the aromatic diisocyanate include the following: m- and/or p-xylene diisocyanate (XDI) and α,α,α',α'-tetramethylxylylene diisocyanate.

Examples of the aliphatic diisocyanate include the following: ethylene diisocyanate, tetramethylene diisocyanate, hexamethylene diisocyanate (HDI), and dodecamethylene diisocyanate.

Examples of the alicyclic diisocyanate include the following: isophorone diisocyanate (IPDI), dicyclohexylmethane-4,4'-diisocyanate, cyclohexylene diisocyanate, and methylcyclohexylene diisocyanate.

Of those, XDI, HDI, and IPDI are preferred.

In the polymerization of the resin S constituting the resin fine particle in the method of producing a toner of the present invention, the mass ratio (Y/X) of the polyester (Y) having a polymerizable unsaturated group to the organic polysiloxane compound (X) having a vinyl group is preferably 1.0 or more and 2.3 or less.

When the mass ratio (Y/X) is 1.0 or more, in the step (f), the amount of the moiety having an organic polysiloxane structure present on the surface of the resin fine particle is prevented from becoming excessively large, the affinity of the resin fine particle for the droplet of the resin solution improves, and hence the dispersion stability of the droplet additionally improves.

When the mass ratio (Y/X) is 2.3 or less, in the step (f), the amount of the moiety having an organic polysiloxane structure present on the surface of the resin fine particle is prevented from becoming excessively small, and hence an affinity for carbon dioxide serving as a dispersion medium is sufficiently obtained. As a result, the function of the resin fine particle as a dispersant is sufficiently obtained and hence the dispersion stability of the droplet improves.

The total of the organic polysiloxane compound and the polyester having a polymerizable unsaturated group in the method of producing a toner of the present invention is preferably 45.0 mass % or more and 80.0 mass % or less with respect to the total amount of the monomers of the resin S constituting the resin fine particle.

When the total of the organic polysiloxane compound and the polyester having a polymerizable unsaturated group is 45.0 mass % or more, the affinities of the resin fine particle for both the carbon dioxide serving as the dispersion medium and the droplet of the resin solution improve, and hence the dispersion stability of the droplet improves.

When the total is 80.0 mass % or less, any other monomer needed for forming the skeleton of the resin is present at a certain ratio, and hence the stability of the resin is obtained.

In the polymerization of the resin S constituting the resin fine particle in the method of producing a toner of the present invention, the monomer composition preferably contains a monomer having two or more polymerizable unsaturated groups (hereinafter sometimes referred to as "polyfunctional monomer"), the monomer having a weight average molecular weight (Mw) of 200 or more and 2,000 or less, in addition to the organic polysiloxane compound and the polyester having a polymerizable unsaturated group.

The weight average molecular weight of the polyfunctional monomer represents a distance between crosslinking points in the resin fine particle. When a polyfunctional monomer having a Mw within the range is used, the value for the B/A can be set to fall within the range represented by the formula (2) with additional ease.

When the Mw of the polyfunctional monomer is 200 or more, the distance between the crosslinking points is prevented from becoming excessively short, and hence the molecular mobility of the side chain having an organic polysiloxane structure present on the surface of the resin fine particle improves. As a result, in a step subsequent to the step (g), an excluded volume effect is sufficiently maintained and hence the dispersion stability of the droplet additionally improves.

When the Mw of the polyfunctional monomer is 2,000 or less, the distance between the crosslinking points lengthens and hence the molecular mobility of the side chain in the resin fine particle moderately improves. Further, the solvent resistance is secured and hence the dispersion stability of the droplet improves.

The amount of the polyfunctional monomer is preferably 1.0 mass % or more and 5.0 mass % or less with respect to the total amount of the monomers to be used in the synthesis of the resin S constituting the resin fine particle.

The number of crosslinking points in the resin S constituting the resin fine particle can be controlled by the amount of the polyfunctional monomer. When the amount of the polyfunctional monomer is set to fall within the range, the value for the B/A can be easily set to fall within the range represented by the formula (2).

When the amount of the polyfunctional monomer is 1.0 mass % or more, the crosslinking points are present in a sufficient number, the solvent resistance of the resin S constituting the resin fine particle improves, and hence the dispersion stability of the droplet additionally improves.

When the amount is 5.0 mass % or less, the crosslinking of the resin is prevented from becoming excessive and hence the molecular mobility of the side chain in the resin fine particle improves. As a result, the excluded volume effect after the step (g) is maintained and hence the dispersion stability of the droplet additionally improves.

Further, the amount of the polyfunctional monomer is more preferably 2.0 mass % or more and 4.0 mass % or less.

A general crosslinking agent having a plurality of vinyl groups can be used as a crosslinking agent to be used for introducing the crosslinked structure into the resin fine particle in the method of producing a toner of the present invention.

Examples of the crosslinking agent that can be used include, but not limited to, the following crosslinking agents.

Diethylene glycol diacrylate, triethylene glycol diacrylate, tetraethylene glycol diacrylate, polyethylene glycol diacrylate, polypropylene glycol diacrylate, 1,6-hexanediol diacrylate, neopentyl glycol diacrylate, tripropylene glycol diacrylate, polypropylene glycol diacrylate, 2,2'-bis(4-(acryloxy/diethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinylbenzene, divinylnaphthalene, divinyl ether, both-terminal acryl-modified silicone, and both-terminal methacryl-modified silicone.

In the polymerization of the resin S constituting the resin fine particle in the method of producing a toner of the present invention, in addition to the organic polysiloxane compound having a vinyl group and the polyester having a polymerizable unsaturated group, any other monomer can be polymerized. A monomer to be used in the polymerization of an ordinary resin material can be used as the other monomer. Examples of the monomer include, but not limited to, the following monomers.

Aliphatic vinyl hydrocarbons: alkenes, such as ethylene, propylene, butene, isobutylene, pentene, heptene, diisobutylene, octene, dodecene, octadecene, and α-olefins except the olefins; and alkadienes, such as butadiene, isoprene, 1,4-pentadiene, 1,6-hexadiene, and 1,7-octadiene. Alicyclic vinyl hydrocarbons: mono- or di-cycloalkenes and alkadienes, such as cyclohexene, cyclopentadiene, vinylcyclohexene, and ethylidenebicycloheptene; and terpenes, such as pinene, limonene, and indene.

Aromatic vinyl hydrocarbons: styrene and hydrocarbyl (alkyl, cycloalkyl, aralkyl, and/or alkenyl)-substituted products thereof, such as α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene; and vinylnaphthalene.

Carboxyl group-containing vinyl-based monomers and metal salts thereof: unsaturated monocarboxylic acids and unsaturated dicarboxylic acids each having 3 or more and 30 or less carbon atoms, and anhydrides thereof and monoalkyl (having 1 or more and 27 or less carbon atoms) esters thereof, e.g., carboxyl group-containing vinyl-based monomers, such as acrylic acid, methacrylic acid, maleic acid, maleic anhydride, a maleic acid monoalkyl ester, fumaric acid, a fumaric acid monoalkyl ester, crotonic acid, itaconic acid, an itaconic acid monoalkyl ester, an itaconic acid glycol monoether, citraconic acid, a citraconic acid monoalkyl ester, and cinnamic acid.

Vinyl esters, such as vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl acrylate, phenyl methacrylate, vinyl methoxyacetate, vinyl benzoate, and ethyl α-ethoxyacrylate, alkyl acrylates and alkyl methacrylates each having a (linear or branched) alkyl group having 1 or more and 11 or less carbon atoms (methyl acrylate, methyl methacrylate, ethyl acrylate, ethyl methacrylate, propyl acrylate, propyl methacrylate, butyl acrylate, butyl methacrylate, 2-ethylhexyl acrylate, and 2-ethylhexyl methacrylate), a dialkyl fumarate (fumaric acid dialkyl ester) (two alkyl groups are linear, branched, or alicyclic groups each having 2 or more and 8 or less carbon atoms), a dialkyl maleate (maleic acid dialkyl ester) (two alkyl groups are linear, branched, or alicyclic groups each having 2 or more and 8 or less carbon atoms), polyallyloxyalkanes (diallyloxyethane, triallyloxyethane, tetraallyloxyethane, tetraallyloxypropane, tetraallyloxybutane, and tetramethallyloxyethane), vinyl-based monomers each having a polyalkylene glycol chain (polyethylene glycol (molecular weight: 300) monoacrylate, polyethylene glycol (molecular weight: 300) monomethacrylate, polypropylene glycol (molecular weight: 500) monoacrylate, polypropylene glycol (molecular weight: 500) monomethacrylate, methyl alcohol ethylene oxide (ethylene oxide is hereinafter abbreviated as EO) 10 mol adduct acrylate, methyl alcohol ethylene oxide (ethylene oxide is hereinafter abbreviated as EO) 10 mol adduct methacrylate, lauryl alcohol EO 30 mol adduct acrylate, and lauryl alcohol EP 30 mol adduct methacrylate), and polyacrylates and polymethacrylates (polyacrylates and polymethacrylates of polyhydric alcohols: ethylene glycol diacrylate, ethylene glycol dimethacrylate, propylene glycol diacrylate, propylene glycol dimethacrylate, neopentyl glycol diacrylate, neopentyl glycol dimethacrylate, trimethylolpropane triacrylate, trimethylolpropane trimethacrylate, polyethylene glycol diacrylate, and polyethylene glycol dimethacrylate).

The following mode is also one preferred mode: the toner particle in the method of producing a toner of the present invention contains a wax. The wax is not particularly limited but examples thereof include the following waxes.

Aliphatic hydrocarbon-based waxes, such as low-molecular weight polyethylene, low-molecular weight polypropylene, a low-molecular weight olefin copolymer, a microcrystalline wax, a paraffin wax, and a Fischer-Tropsch wax; an oxide of an aliphatic hydrocarbon-based wax, such as a polyethylene oxide wax; a wax containing a fatty acid ester as a main component, such as an aliphatic hydrocarbon-based ester wax; and a wax obtained by deacidifying part or all of fatty acid esters, such as a deacidified carnauba wax; a partially esterified product of a fatty acid and a polyhydric alcohol, such as behenic acid monoglyceride; and a methyl ester compound having a hydroxyl group obtained by subjecting a vegetable oil and fat to hydrogenation.

Of those, an aliphatic hydrocarbon-based wax and an ester wax are particularly preferably used in the method of producing a toner of the present invention. In addition, the ester wax used in the present invention is preferably a trifunctional or more ester wax, more preferably a tetrafunctional or more ester wax, particularly preferably a hexafunctional or more ester wax.

The ester wax that is trifunctional or more is obtained by, for example, the condensation of an acid that is trivalent or more and a long linear saturated alcohol, or the synthesis of an alcohol that is trihydric or more and a long linear saturated fatty acid.

Examples of the trihydric or more alcohol that can be used in the wax can include glycerin, trimethylolpropane, erythritol, pentaerythritol, and sorbitol. In addition, as condensates thereof, there are given, for example: so-called polyglycerins, such as diglycerin, triglycerin, tetraglycerin, hexaglycerin, and decaglycerin, which are condensates of glycerin; ditrimethylolpropane and tristrimethylolpropane, which are condensates of trimethylolpropane; and dipentaerythritol and trispentaerythritol, which are condensates of pentaerythritol. Of those, a structure having a branched structure is preferred, pentaerythritol or dipentaerythritol is more preferred, and dipentaerythritol is particularly preferred.

Examples of the long-chain linear saturated fatty acid can include caproic acid, caprylic acid, octylic acid, nonylic acid, decanoic acid, dodecanoic acid, lauric acid, tridecanoic acid, myristic acid, palmitic acid, stearic acid, and behenic acid. Of those, myristic acid, palmitic acid, stearic acid, and behenic acid are preferred from the viewpoint of the melting point of the wax.

Examples of the trivalent or more acid that can be used in the present invention can include trimellitic acid and butanetetracarboxylic acid.

Examples of the long-chain linear saturated alcohol can include capryl alcohol, lauryl alcohol, myristyl alcohol, palmityl alcohol, stearyl alcohol, and behenyl alcohol. Of those, myristyl alcohol, palmityl alcohol, stearyl alcohol, and behenyl alcohol are preferred from the viewpoint of the melting point of the wax.

The addition amount of the wax in the toner particle is preferably 1.0 part by mass or more and 20.0 parts by mass or less, more preferably 2.0 parts by mass or more and 15.0 parts by mass or less with respect to 100.0 parts by mass of the toner particle.

The wax preferably has a highest endothermic peak at 60° C. or more and 120° C. or less in measurement with a differential scanning calorimeter (DSC). The wax more preferably has the peak at 60° C. or more and 90° C. or less.

In the method of producing a toner of the present invention, the toner contains a colorant. Examples of the colorant that is preferably used in the present invention include an organic pigment, an organic dye, an inorganic pigment, carbon black serving as a black colorant, and a magnetic particle. In addition to the foregoing, a colorant that has hitherto been used in a toner can be used.

Examples of the yellow colorant include the following: a condensed azo compound, an isoindolinone compound, an anthraquinone compound, an azo metal complex, a methine compound, and an arylamide compound. Specifically, C.I. Pigment Yellow 12, 13, 14, 15, 17, 62, 74, 83, 93, 94, 95, 109, 110, 111, 128, 129, 147, 155, 168, and 180 are suitably used.

Examples of the magenta colorant include the following: a condensed azo compound, a diketopyrrolopyrrole compound, anthraquinone, a quinacridone compound, a base dye lake compound, a naphthol compound, a benzimidazolone compound, a thioindigo compound, and a perylene compound. Specifically, C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254 are suitably used.

Examples of the cyan colorant include the following: a copper phthalocyanine compound and derivatives thereof, an anthraquinone compound, and a base dye lake compound. Specifically, C.I. Pigment Blue 1, 7, 15, 15:1, 15:2, 15:3, 15:4, 60, 62, and 66 are suitably used.

The colorant to be used in the method of producing a toner of the present invention is selected from the viewpoints of a hue angle, chroma, lightness, light fastness, OHP transparency, and dispersibility in the toner.

The colorant is preferably used by being added in an amount of 1.0 part by mass or more and 20.0 parts by mass or less with respect to 100.0 parts by mass of the toner particle. When the magnetic particle is used as the colorant, the addition amount is preferably 40.0 parts by mass or more and 150.0 parts by mass or less with respect to 100.0 parts by mass of the toner particle.

In the method of producing a toner of the present invention, a charge control agent may be incorporated into the toner particle as required, or may be externally added to the toner particle. The blending of the charge control agent stabilizes the charging characteristic, and hence can control its triboelectric charge quantity to an optimum value in accordance with a developing system.

A known charge control agent can be utilized as the charge control agent, and a charge control agent having a high charging speed and capable of stably maintaining a constant charge quantity is particularly preferred.

Examples of the charge control agent that controls the toner so that the toner may be negatively chargeable include the following compounds. An organometallic compound and a chelate compound are effective, and examples thereof include a monoazo metal compound, an acetylacetone metal compound, and aromatic oxycarboxylic acid-, aromatic dicarboxylic acid-, oxycarboxylic acid-, and dicarboxylic acid-based metal compounds. Examples of the charge control agent that controls the toner so that the toner may be positively chargeable include the following compounds: nigrosine, a quaternary ammonium salt, a metal salt of a higher fatty acid, diorganotin borates, a guanidine compound, and an imidazole compound.

The blending amount of the charge control agent is preferably 0.01 part by mass or more and 20.0 parts by mass or less, more preferably 0.5 part by mass or more and 10.0 parts by mass or less with respect to 100.0 parts by mass of the toner particle.

In the method of producing a toner of the present invention, an inorganic fine particle is preferably added as a flowability improver to the toner particle. Examples of the inorganic fine particle to be added to the toner particle include fine particles, such as a silica fine particle, a titanium oxide fine particle, an alumina fine particle, and double oxide fine particles thereof. Of the inorganic fine particles, a silica fine particle and a titanium oxide fine particle are preferred.

Examples of the silica fine particles include dry silica or fumed silica produced by the vapor phase oxidation of a silicon halide and wet silica produced from water glass. Of those, dry silica, which has a small number of silanol groups on the surface and inside of the silica fine particles and has small amounts of $Na_2O$ and $SO_3^{2-}$, is preferred. In addition, the dry silica may be composite fine particles of silica and any other metal oxide produced by using a metal halide, such as aluminum chloride or titanium chloride, together with a silicon halide in the production process for the dry silica.

The inorganic fine particle is preferably externally added to the toner particle for improving the flowability of the toner and uniformizing the charging of the toner. In addition, an inorganic fine particle subjected to a hydrophobic treatment are more preferably used because the adjustment of the charge quantity of the toner, an improvement in its environmental stability, and improvements in its characteristics under a high-humidity environment can be achieved by subjecting the inorganic fine particle to the hydrophobic treatment. When the inorganic fine particle added to the toner absorbs moisture, the charge quantity of the toner reduces, and hence reductions in its developability and transferability are liable to occur.

The weight average particle diameter (D4) of the toner particles according to the production method of the present invention is preferably 3.0 µm or more and 8.0 µm or less, more preferably 5.0 µm or more and 7.0 µm or less. The toner particles having such weight average particle diameter (D4) is preferably used for sufficiently satisfying dot reproducibility while making the handleability of the toner satisfactory. The ratio (D4/D1) of the weight average particle diameter (D4) of the resultant toner particles to the number average particle diameter (D1) thereof is preferably less than 1.25.

In addition, the average circularity of the toner particles according to the production method of the present invention is preferably 0.97 or more. The average circularity is an indicator representing the unevenness of the surface of the toner particles, and as the value approaches 1.00, the unevenness is reduced and hence the surface is uniformized. Accordingly, various external additives each having a function of imparting chargeability to the toner can be externally added to the surface of the toner in a uniform manner.

Further, the coefficient of variation of the circularities of the toner particles according to the production method of the present invention is preferably less than 4.00. The coefficient of variation of the circularities is an indicator representing the distribution of the circularities, and as the value becomes smaller, the shape of the toner particles becomes more uniform and hence a cleaning failure or the like hardly occurs at the time of its practical use.

Methods of measuring respective physical property values specified in the present invention are described below.

<Measurement Method for Weight Average Particle Diameter (D4) and Number Average Particle Diameter (D1) of Toner Particles>

The weight average particle diameter (D4) and number average particle diameter (D1) of the toner particles are calculated as described below. A precision particle size distribution measuring apparatus based on a pore electrical resistance method provided with a 100-μm aperture tube "Coulter Counter Multisizer 3" (trademark, manufactured by Beckman Coulter, Inc.) is used as a measuring apparatus. Dedicated software included with the apparatus "Beckman Coulter Multisizer 3 Version 3.51" (manufactured by Beckman Coulter, Inc.) is used for setting measurement conditions and analyzing measurement data. It should be noted that the measurement is performed at a number of effective measurement channels of 25,000.

An electrolyte aqueous solution prepared by dissolving reagent grade sodium chloride in ion-exchanged water so as to have a concentration of about 1 mass %, for example, "ISOTON II" (manufactured by Beckman Coulter, Inc.) can be used in the measurement.

It should be noted that the dedicated software is set as described below prior to the measurement and the analysis.

In the "Change Standard Operating Method (SOM)" screen of the dedicated software, the total count number of a control mode is set to 50,000 particles, the number of times of measurement is set to 1, and a value obtained by using "standard particles having a particle diameter of 10.0 μm" (manufactured by Beckman Coulter, Inc.) is set as a Kd value. A threshold and a noise level are automatically set by pressing a "Threshold/Measure Noise Level" button. In addition, a current is set to 1,600 μA, a gain is set to 2, and an electrolyte solution is set to ISOTON II, and a check mark is placed in a check box "Flush Aperture Tube after Each Run."

In the "Convert Pulses to Size Settings" screen of the dedicated software, a bin spacing is set to a logarithmic particle diameter, the number of particle diameter bins is set to 256, and a particle diameter range is set to the range of from 2 μm to 60 μm.

A specific measurement method is as described below.

(1) About 200 ml of the electrolyte aqueous solution is charged into a 250-ml round-bottom glass beaker dedicated for Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "Flush Aperture" function of the dedicated software.

(2) About 30 ml of the electrolyte aqueous solution is charged into a 100-ml flat-bottom glass beaker. About 0.3 ml of a diluted solution prepared by diluting "Contaminon N" (a 10 mass % aqueous solution of a neutral detergent for washing a precision measuring unit containing a nonionic surfactant, an anionic surfactant, and an organic builder and having a pH of 7, manufactured by Wako Pure Chemical Industries, Ltd.) with ion-exchanged water by about 3 mass fold is added as a dispersant to the electrolyte aqueous solution.

(3) An ultrasonic dispersing unit "Ultrasonic Dispersion System Tetora 150" (manufactured by Nikkaki Bios Co., Ltd.) is prepared in which two oscillators each having an oscillatory frequency of 50 kHz are built so as to be out of phase by 180° and which has an electrical output of 120 W. About 3.3 l of ion-exchange water is charged into the water tank of the ultrasonic dispersing unit. About 2 ml of Contaminon N is added into the water tank.

(4) The beaker in the section (2) is set in the beaker fixing hole of the ultrasonic dispersing unit, and the ultrasonic dispersing unit is operated. Then, the height position of the beaker is adjusted so that the liquid level of the electrolyte aqueous solution in the beaker resonates to the fullest extent possible.

(5) About 10 mg of toner particles are gradually added to and dispersed in the electrolyte aqueous solution in the beaker in the section (4) under a state in which the electrolyte aqueous solution is irradiated with an ultrasonic wave. Then, the ultrasonic dispersion treatment is continued for an additional 60 seconds. It should be noted that the temperature of water in the water tank is appropriately adjusted to the range of from 10° C. or more to 40° C. or less upon ultrasonic dispersion.

(6) The electrolyte aqueous solution in the section (5) in which the toner particles have been dispersed is dropped with a pipette to the round-bottom beaker in the section (1) placed in the sample stand, and the concentration of the toner particles to be measured is adjusted to about 5%. Then, measurement is performed until the particle diameters of 50,000 particles are measured.

(7) The measurement data is analyzed with the dedicated software included with the apparatus, and the weight average particle diameter (D4) and the number average particle diameter (D1) are calculated. It should be noted that the "Average Diameter" on the "Analysis/Volume Statistics (Arithmetic Average)" screen of the dedicated software when the dedicated software is set to show a graph in a vol % unit is the weight average particle diameter (D4), and the "Average Diameter" on the "Analysis/Number Statistics (Arithmetic Average)" screen of the dedicated software when the dedicated software is set to show a graph in a number % unit is the number average particle diameter (D1).

<Methods of Measuring Average Circularity, and Coefficient of Variation of Circularities, of Toner Particles>

The average circularity, and coefficient of variation of the circularities, of the toner particles are measured with a flow type particle image analyzer "FPIA-3000" (manufactured by Sysmex Corporation) under measurement and analysis conditions at the time of a calibration operation.

A specific measurement method is as described below. First, about 20 ml of ion-exchanged water from which an impure solid and the like have been removed in advance is loaded into a container made of glass. About 0.2 ml of a diluted solution obtained by diluting "Contaminon N" (a 10 mass % aqueous solution of a neutral detergent for washing a precision measuring unit containing a nonionic surfactant, an anionic surfactant, and an organic builder and having a pH of 7, manufactured by Wako Pure Chemical Industries, Ltd.) with ion-exchanged water by about 3 mass fold is added as a dispersant to the container. Further, about 0.02 g of a measurement sample is added to the container, and the mixture is subjected to a dispersion treatment with an ultrasonic dispersing unit for 2 minutes to provide a dispersion liquid for measurement. At that time, the dispersion liquid is appropriately cooled so as to have a temperature of 10° C. or more and 40° C. or less. A desktop ultrasonic cleaning and dispersing unit having an oscillatory frequency of 50 kHz and an electrical output of 150 W (such as "VS-150" (manufactured by VELVO-CLEAR)) is used as the ultrasonic dispersing unit. A predetermined amount of ion-exchanged water is loaded into a water tank, and about 2 ml of the Contaminon N is added to the water tank.

The flow type particle image analyzer having a standard objective lens (magnification: 10) mounted thereon was used in the measurement, and a particle sheath "PSE-900A" (manufactured by Sysmex Corporation) was used as a sheath liquid. The dispersion liquid prepared in accordance with the procedure is introduced into the flow type particle image analyzer, and 3,000 toner particles are subjected to measurement according to the total count mode of an HPF measurement mode. Then, a binarization threshold at the time of particle analysis is set to 85% and particle diameters to be analyzed are specified to a certain range. Thus, the number ratio (%) and average circularity of the particles in the range can be calculated. The average circularity and standard deviation of the toner particles were determined for toner particles each having a circle-equivalent diameter of 1.985 μm or more and 200.00 μm or less, and the coefficient of variation was determined from values for the average circularity and the standard deviation.

In the measurement, automatic focusing is performed with standard latex particles (obtained by diluting, for example, "RESEARCH AND TEST PARTICLES Latex Microsphere Suspensions 5200A" manufactured by Duke Scientific with ion-exchanged water) prior to the initiation of the measurement. After that, focusing is preferably performed every 2 hours from the initiation of the measurement.

It should be noted that in Examples of the present application, a flow type particle image analyzer that had been subjected to a calibration operation by Sysmex Corporation and had received a calibration certificate issued by Sysmex Corporation was used. The measurement was performed under measurement and analysis conditions identical to those at the time of the reception of the calibration certificate except that the particle diameters to be analyzed were limited to ones each corresponding to a circle-equivalent diameter of 1.985 μm or more and less than 200.00 μm.

<Method of Measuring Number Average Particle Diameter of Resin Fine Particles>

In the present invention, the number average particle diameter of the primary particles of the resin fine particles is measured with Zeta Sizer Nano-ZS (manufactured by Malvern Instruments Ltd.). The refractive index of each of the resin fine particles, and the refractive index and viscosity of a dispersion solvent are input as measurement conditions. In addition, samples are prepared by diluting dispersion liquids of the resin fine particles serving as measuring objects in water and an organic solvent so that the diluted liquids may each have a solid-liquid ratio of 0.10 mass % (±0.02 mass %), and the samples are each collected in a quartz cell and loaded into a measuring portion.

<Methods of Measuring Number Average Molecular Weight (Mn), Weight Average Molecular Weight (Mw), and Peak Molecular Weight (Mp)>

The molecular weight (Mn, Mw, Mp) of the tetrahydrofuran (THF) soluble matter of each of the resins is measured by gel permeation chromatography (GPC) as described below.

First, a sample is dissolved in THF at room temperature over 24 hours. Then, the resultant solution is filtered with a solvent-resistant membrane filter "MyShoriDisk" (manufactured by Tosoh Corporation) having a pore diameter of 0.2 μm to provide a sample solution. It should be noted that the concentration of a THF-soluble component in the sample solution is adjusted to 0.8 mass %. Measurement is performed with the sample solution under the following conditions.

Apparatus: HLC 8120 GPC (detector: RI) (manufactured by Tosoh Corporation)
Column: Septuplicate of Shodex KF-801, 802, 803, 804, 805, 806, and 807 (manufactured by Showa Denko K.K.)
Eluent: tetrahydrofuran (THF)
Flow rate: 1.0 ml/min
Oven temperature: 40.0° C.
Sample injection amount: 0.10 ml In the calculation of the molecular weight of the sample, a molecular weight calibration curve prepared with standard polystyrene resins (product names "TSK standard polystyrenes F-850, F-450, F-288, F-128, F-80, F-40, F-20, F-10, F-4, F-2, F-1, A-5000, A-2500, A-1000, and A-500" manufactured by Tosoh Corporation) is used.

<Method of Measuring Average Number of Polymerizable Unsaturated Groups in One Molecule of Polyester Having Polymerizable Unsaturated Group>

The measurement of the average number of polymerizable unsaturated groups in a polyester having a polymerizable unsaturated group is performed by $^1$H-NMR under the following conditions.

Measuring apparatus: FT NMR apparatus JNM-EX400 (manufactured by JEOL Ltd.)
Measuring frequency: 400 MHz
Pulse condition: 5.0 μs
Frequency range: 10,500 Hz
Cumulated number: 64 times
Measuring temperature: 30.0° C.

A sample is prepared by: loading 50.0 mg of the polyester having a polymerizable unsaturated group into a sample tube having an inner diameter of 5.0 mm; adding deuterated chloroform ($CDCl_3$) as a solvent to the tube; and dissolving the polyester in a thermostat at 40.0° C.

The $^1$H-NMR spectrum of the sample is measured and peak information to be assigned to the following units is acquired.

(1) A unit Y1 derived from a compound having a polymerizable unsaturated group
(2) A unit Y2 derived from a diol free of any polymerizable unsaturated group
(3) A unit Y3 derived from a dicarboxylic acid free of any polymerizable unsaturated group The compound having a polymerizable unsaturated group includes the diol having a polymerizable unsaturated group, the dicarboxylic acid having a polymerizable unsaturated group, the vinyl-based compound having a hydroxyl group, and the vinyl-based compound having an isocyanate group.

An inherent peak P1 that does not coincide with any other unit is selected from peaks to be assigned to the unit Y1, and an integrated value S1 of the selected peak P1 is calculated.

An inherent peak P2 that does not coincide with any other unit is selected from peaks to be assigned to the unit Y2, and an integrated value S2 of the selected peak P2 is calculated.

An inherent peak P3 that does not coincide with any other unit is selected from peaks to be assigned to the unit Y3, and an integrated value S3 of the selected peak P3 is calculated.

The average number of polymerizable unsaturated groups in one molecule of the polyester having a polymerizable unsaturated group is determined by using the integrated value S1, the integrated value S2, and the integrated value S3 as described below.

Average number of polymerizable unsaturated groups in one molecule of polyester having polymerizable unsaturated group=$\{Mp \times (S1/n1)\}/\{M1 \times (S1/n1)+M2 \times (S2/n2)+M3 \times (S3/n3)\}$ It should be noted that n1, n2, and n3 represent the numbers of hydrogen atoms in the units Y1, Y2, and Y3, respectively, M1, M2, and M3 represent the molecular weights of the units Y1, Y2, and Y3, respectively, and Mp represents the molecular weight of the polyester having a polymerizable unsaturated group.

<Method of Measuring Melting Point of Each of Crystalline Polyester Resin, Block Polymer, and Wax>

The melting point of each of a crystalline polyester resin, a block polymer, and a wax is measured with DSC Q2000 (manufactured by TA Instruments) under the following conditions.

Rate of temperature increase: 10° C./min
Measurement-starting temperature: 20° C.
Measurement-ending temperature: 180° C.

The melting points of indium and zinc are used in the temperature correction of the detecting portion of the apparatus, and the heat of fusion of indium is used in the correction of a heat quantity.

Specifically, about 2 mg of the sample is precisely weighed, loaded into a pan made of aluminum, and subjected to measurement once. An empty pan made of aluminum is used as a reference. The measurement is performed by increasing the temperature of the sample to 200° C. once, subsequently decreasing the temperature to 20° C., and then increasing the temperature again. The peak temperatures of the highest endothermic peak of a DSC curve in the temperature range of from 20° C. to 200° C. in the first temperature increase process in the case of the crystalline polyester and the block polymer, and in the second temperature increase process in the case of the wax are defined as the melting points of the crystalline polyester, the block polymer, and the wax, respectively.

<Method of Measuring Glass Transition Point (Tg) of Each of Amorphous Polyester Resin and Amorphous Vinyl Resin>

The glass transition point of each of an amorphous polyester resin and an amorphous vinyl resin is determined as described below. A tangent between a curve showing the highest endothermic and a baseline in front of, or behind, is drawn from a reversing heat flow curve at the time of the temperature increase obtained by the DSC measurement, the middle point of a straight line connecting the points of intersection of the respective tangents is determined, and the temperature of the middle point is defined as the glass transition point.

<Methods of Measuring Particle Diameters of Wax Fine Particles and Colorant Fine Particles>

In the present invention, the particle diameter of each fine particle is measured with a Microtrac particle size distribution-measuring apparatus HRA (X-100) (manufactured by Nikkiso Co., Ltd.) in the preset range of from 0.001 μm to 10 μm, and is measured as a volume average particle diameter (μm or nm). It should be noted that water is selected as a diluent solvent.

<Method of Measuring Amount of Si Derived from Organic Polysiloxane Structure by X-Ray Photoelectron Spectroscopy (ESCA)>

In the present invention, the amounts of Si derived from organic polysiloxane structures present on the surface of a treated resin fine particle obtained by subjecting a resin fine particle to an exposure treatment with carbon dioxide in a liquid state and on the surface of the resin fine particle before the exposure treatment are calculated by surface composition analysis based on X-ray photoelectron spectroscopy (ESCA).

An apparatus and measurement conditions for the ESCA are as described below.

Used apparatus: Quantum 2000, manufactured by ULVAC-PHI, Inc.
Analysis method: narrow analysis
Measurement Conditions:
X-ray source: Al-Kα
X-ray condition: 100 μm, 25 W, 15 kV
Photoelectron acceptance angle: 45°
PassEnergy: 58.70 eV
Measurement range: φ100 μm Measurement is performed under the foregoing conditions, and a peak derived from the C—C bond of a carbon is orbital is corrected to 285 eV. After that, the amount of Si derived from the organic polysiloxane structure with respect to the total amount of constituent elements is calculated by using a relative sensitivity factor provided by ULVAC-PHI, Inc. from the peak area of the Si—O bond of a silicon 2p orbital whose peak top is detected at 100 eV or more and 103 eV or less. It should be noted that when any other peak of the Si 2p orbital ($SiO_2$: more than 103 eV and 105 eV or less) is detected, the peak area of the Si—O bond is calculated by subjecting the peak of the Si—O bond to waveform separation.

EXAMPLES

The present invention is more specifically described below by way of Production Examples and Examples. However, the present invention is by no means limited by Production Examples and Examples.

<Synthesis of Polyester (y1) Having Polymerizable Unsaturated Group>

The following raw materials were loaded into a two-necked flask that had been heated and dried while nitrogen was introduced into the flask.

| | |
|---|---|
| Sebacic acid | 128.0 parts by mass |
| Fumaric acid | 2.6 parts by mass |
| 1,6-Hexanediol | 78.5 parts by mass |
| Dibutyltin oxide | 0.1 part by mass |

The system was purged with nitrogen by a decompression operation, and then the mixture was stirred at 180° C. for 6 hours. After that, while the stirring was continued, a temperature was gradually increased to 230° C. under reduced pressure, and was held at the temperature for 2 hours. When the mixture was brought into a viscous state, a reaction was stopped by cooling the mixture with air. Thus, a polyester (y1) having a polymerizable unsaturated group was synthesized. The melting point, Mn, and Mw of the polyester (y1) having a polymerizable unsaturated group were 56° C., 19,000, and 44,000, respectively, and the average number of polymerizable unsaturated groups in one molecule was 2.0.

<Synthesis of Polyesters (y2) to (y7) Each Having Polymerizable Unsaturated Group>

Polyesters (y2) to (y7) each having a polymerizable unsaturated group were each synthesized in exactly the same manner as in the synthesis of the polyester (y1) having a polymerizable unsaturated group except that the addition amounts of the raw materials to be used were changed as shown in Table 1.

TABLE 1

|  | Raw material and addition amount (part(s) by mass) | | | | Average number of polymerizable unsaturated groups in one molecule | Melting point (° C.) | Mn | Mw | Mp |
| --- | --- | --- | --- | --- | --- | --- | --- | --- | --- |
|  | Sebacic acid | Fumaric acid | 1,6-Hexanediol | Dibutyltin oxide |  |  |  |  |  |
| Polyester (y1) having polymerizable unsaturated group | 128.0 | 2.6 | 78.5 | 0.1 | 2.0 | 56 | 19,000 | 44,000 | 29,000 |
| Polyester (y2) having polymerizable unsaturated group | 128.0 | 1.2 | 77.0 | 0.1 | 1.0 | 61 | 21,000 | 41,000 | 33,000 |
| Polyester (y3) having polymerizable unsaturated group | 128.0 | 2.0 | 78.0 | 0.1 | 1.5 | 58 | 18,000 | 32,000 | 26,000 |
| Polyester (y4) having polymerizable unsaturated group | 128.0 | 3.5 | 79.6 | 0.1 | 2.5 | 52 | 18,000 | 31,000 | 25,000 |
| Polyester (y5) having polymerizable unsaturated group | 128.0 | 3.9 | 80.0 | 0.1 | 2.8 | 52 | 18,000 | 33,000 | 25,000 |
| Polyester (y6) having polymerizable unsaturated group | 129.5 | 4.1 | 81.1 | 0.1 | 3.0 | 50 | 18,000 | 33,000 | 26,000 |
| Polyester (y7) having polymerizable unsaturated group | 129.6 | 7.3 | 85.2 | 0.1 | 3.2 | 51 | 12,000 | 27,000 | 22,000 |

<Preparation of Organic Polysiloxane Compounds (x1) to (x3) Each Having Vinyl Group>

In the present invention, commercially available one-terminal type vinyl-modified organic polysiloxanes shown in Table 2 were prepared, and were used as organic polysiloxane compounds (x1) to (x3) each having a vinyl group. The structure of each of the organic polysiloxane compounds (x1) to (x3) each having a vinyl group is represented by the following formula (12), and details about $R^2$ to $R^5$ and a value for the polymerization degree n are shown in Table 2.

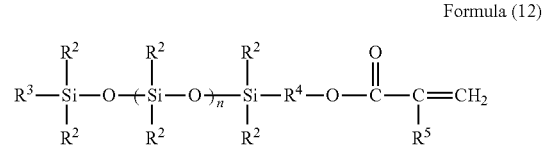

Formula (12)

TABLE 2

|  | Product name | Manufacturer name | Molecular weight | $R^2$ | $R^3$ | $R^4$ | $R^5$ | Polymerization degree n |
| --- | --- | --- | --- | --- | --- | --- | --- | --- |
| Organic polysiloxane compound (x1) having vinyl group | X-22-2475 | Shin-Etsu Chemical Co., Ltd. | 420 | Methyl group | Methyl group | Propylene group | Methyl group | 3 |
| Organic polysiloxane compound (x2) having vinyl group | X-22-174ASX | Shin-Etsu Chemical Co., Ltd. | 900 | Methyl group | Methyl group | Propylene group | Methyl group | 10 |
| Organic polysiloxane compound (x3) having vinyl group | X-22-174BX | Shin-Etsu Chemical Co., Ltd. | 2,300 | Methyl group | Methyl group | Propylene group | Methyl group | 29 |

<Preparation of Organic Polysiloxane Compound (x4) Having Vinyl Group>

In the present invention, a commercially available both-terminal type vinyl-modified organic polysiloxane shown in Table 3 was prepared, and was used as an organic polysiloxane compound (x4) having a vinyl group. The structure of the organic polysiloxane compound (x4) having a vinyl group is represented by the following formula (13), $R^6$ and $R^8$ each represent a methyl group, $R^7$ represents a propylene group, and the polymerization degree n represents 2.

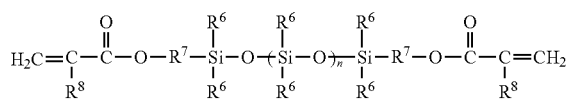

Formula (13)

TABLE 3

| | Product name | Manufacturer name | Molecular weight | $R^6$ | $R^7$ | $R^8$ | Polymerization degree n |
|---|---|---|---|---|---|---|---|
| Organic polysiloxane compound (x4) having vinyl group | X-22-164AS | Shin-Etsu Chemical Co., Ltd. | 450 | Methyl group | Propylene group | Methyl group | 2 |

<Preparation of Polyfunctional Monomers (z1) to (z4)>

In the present invention, commercially available polyfunctional monomers (monomers each having two or more polymerizable unsaturated groups) shown in Table 4 were prepared, and were used as polyfunctional monomers (z1) to (z4). The structures of the polyfunctional monomers (z1) to (z4) are each represented by the following formula (14), and the sum of polymerization degrees m and n is shown in Table 4.

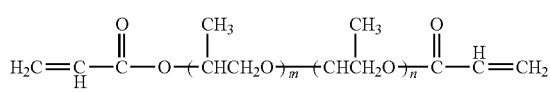

Formula (14)

TABLE 4

| | Product name | Manufacturer name | Molecular weight | m + n |
|---|---|---|---|---|
| Polyfunctional monomer (z1) | APG400 | Shin-Nakamura Chemical Co., Ltd. | 536 | 7 |
| Polyfunctional monomer (z2) | APG100 | Shin-Nakamura Chemical Co., Ltd. | 242 | 2 |
| Polyfunctional monomer (z3) | APG200 | Shin-Nakamura Chemical Co., Ltd. | 300 | 3 |
| Polyfunctional monomer (z4) | APG700 | Shin-Nakamura Chemical Co., Ltd. | 808 | 11 |

<Preparation of Resin Fine Particle Dispersion Liquid 1>

The following raw materials and 800.0 parts by mass of toluene were loaded into a two-necked flask that had been heated and dried while nitrogen was introduced into the flask. The materials were heated to 70° C. to be completely dissolved. Thus, a monomer composition 1 was prepared.

| | |
|---|---|
| Polyester (y1) having a polymerizable unsaturated group | 40.0 parts by mass |
| Organic polysiloxane compound (x1) having a vinyl group | 25.0 parts by mass |
| Stylene (St) | 25.0 parts by mass |
| Methacrylic acid (MAA) | 10.0 parts by mass |
| Polyfunctional monomer (z1) | 2.0 parts by mass |

After the temperature was reduced to 25° C. while being stirred at 250 rpm, the monomer composition 1 was subjected to nitrogen bubbling for 30 minutes. After that, the monomer composition 1 was mixed with 0.6 part by mass of azobismethoxydimethylvaleronitrile serving as a polymerization initiator. After that, the mixture was heated to 75° C. and subjected to a reaction for 6 hours. Further, the mixture was heated to 80° C. and subjected to a reaction for 1 hour. After that, the resultant was cooled with air to provide a dispersion of a coarse particulate resin.

The resultant dispersion of the coarse particulate resin was loaded into a stirring tank whose temperature could be regulated, and was transferred to CLEAR SS5 (manufactured by M Technique Co., Ltd.) with a pump at a flow rate of 35 g/min to be treated. Thus, a dispersion of a fine particulate resin was obtained. Conditions for the treatment of the dispersion with the CLEAR SS5 were as follows: the peripheral speed of the outermost peripheral portion of the rotating ring-shaped disc of the CLEAR SS5 was set to 15.7 m/s, and a gap between the rotating ring-shaped disc and a fixed ring-shaped disc was set to 1.6 μm. In addition, the temperature of the stirring tank was regulated so that a liquid temperature after the treatment with the CLEAR SS5 became 40° C. or less.

The resin fine particles and toluene in the dispersion were separated from each other with a centrifugal separator. Conditions for the centrifugal separation are described below.

Centrifuge: H-9R (manufactured by KOKUSAN Corporation)
Rotor: $B_{N1}$ rotor (manufactured by KOKUSAN Corporation)
Preset temperature in apparatus: 4° C.
Number of rotations: 16,500 rpm
Time: 2.5 hours After that, a supernatant was removed. Thus, a concentrated dispersion of the fine particulate resin was obtained.

The concentrated dispersion of the fine particulate resin and acetone were loaded into a beaker with a stirring device, and the fine particulate resin was dispersed in acetone with a high-power ultrasonic homogenizer (VCX-750). After that, acetone was further added to the resultant. Thus, a resin fine particle dispersion liquid 1 having a solid content concentration of 10.0 mass % was prepared. The number average particle diameter of the resin fine particles in the resin fine particle dispersion liquid 1 thus prepared was 0.14 µm. In addition, the resin fine particles were collected by filtering and drying part of the resin fine particle dispersion liquid 1. The Si amount A of the resin fine particles measured by ESCA was 5.1 atomic % and the Si amount B of the resin fine particles after their exposure treatment with carbon dioxide in a liquid state was 7.1 atomic %. The extent B/A to which the surface composition changed after the exposure treatment as compared to that before the treatment was 1.40. The mass ratio (Y/X) of a polyester (Y) having a polymerizable unsaturated group to an organic polysiloxane compound (X) having a vinyl group, and the total (X+Y) of the compounds are shown in Table 5-2.

<Preparation of Resin Fine Particle Dispersion Liquids 2 to 37>

Resin fine particle dispersion liquids 2 to 37 were each obtained by changing the addition amounts of the polyester having a polymerizable unsaturated group, the organic polysiloxane compound having a vinyl group, the polyfunctional monomer, and any other monomer in the preparation of the resin fine particle dispersion liquid 1 to those shown in Table 5-1. The number average particle diameter of the resin fine particles in each of the resultant resin fine particle dispersion liquids 2 to 37, the Si amount A of the resin fine particles measured by ESCA, and the extent B/A to which the surface composition changed after the exposure treatment with carbon dioxide in a liquid state as compared to that before the treatment are shown in Table 5-2.

TABLE 5-1

| Resin fine particle dispersion liquid | Organic polysiloxane compound having vinyl group | | Polyester having polymerizable unsaturated group | | Polyfunctional monomer | | Other monomer | |
|---|---|---|---|---|---|---|---|---|
| | | | | | | | St | MAA |
| | Kind | Part(s) by mass | Kind | Part(s) by mass | Kind | Part(s) by mass | (Part(s) by mass) | (Part(s) by mass) |
| 1 | x1 | 25.0 | y1 | 40.0 | z1 | 2.0 | 25.0 | 10.0 |
| 2 | x1 | 16.0 | y1 | 40.0 | z1 | 2.0 | 34.0 | 10.0 |
| 3 | x1 | 29.0 | y1 | 40.0 | z1 | 2.0 | 21.0 | 10.0 |
| 4 | x1 | 25.0 | y1 | 20.0 | z1 | 2.0 | 45.0 | 10.0 |
| 5 | x1 | 25.0 | y1 | 30.0 | z1 | 2.0 | 35.0 | 10.0 |
| 6 | x1 | 25.0 | y1 | 55.0 | z1 | 2.0 | 10.0 | 10.0 |
| 7 | x1 | 18.0 | y1 | 29.0 | z1 | 2.0 | 43.0 | 10.0 |
| 8 | x1 | 25.0 | y1 | 40.0 | z1 | 1.0 | 25.0 | 10.0 |
| 9 | x1 | 25.0 | y1 | 40.0 | z1 | 3.0 | 25.0 | 10.0 |
| 10 | x1 | 25.0 | y1 | 40.0 | z1 | 4.0 | 25.0 | 10.0 |
| 11 | x1 | 25.0 | y1 | 40.0 | z1 | 4.5 | 25.0 | 10.0 |
| 12 | x2 | 25.0 | y1 | 40.0 | z1 | 2.0 | 25.0 | 10.0 |
| 13 | x3 | 25.0 | y4 | 40.0 | z1 | 2.0 | 25.0 | 10.0 |
| 14 | x3 | 25.0 | y1 | 40.0 | z1 | 3.0 | 25.0 | 10.0 |
| 15 | x1 | 25.0 | y2 | 40.0 | z1 | 2.0 | 25.0 | 10.0 |
| 16 | x1 | 25.0 | y3 | 40.0 | z1 | 2.0 | 25.0 | 10.0 |
| 17 | x1 | 25.0 | y4 | 40.0 | z1 | 2.0 | 25.0 | 10.0 |
| 18 | x1 | 25.0 | y5 | 40.0 | z1 | 2.0 | 25.0 | 10.0 |
| 19 | x1 | 25.0 | y4 | 40.0 | — | 0.0 | 25.0 | 10.0 |
| 20 | x1 | 25.0 | y6 | 40.0 | — | 0.0 | 25.0 | 10.0 |
| 21 | x1 | 25.0 | y2 | 40.0 | z2 | 2.0 | 25.0 | 10.0 |
| 22 | x1 | 25.0 | y1 | 40.0 | z3 | 2.0 | 25.0 | 10.0 |
| 23 | x1 | 25.0 | y1 | 40.0 | z4 | 2.0 | 25.0 | 10.0 |
| 24 | x1 | 15.0 | y1 | 40.0 | z1 | 2.0 | 35.0 | 10.0 |
| 25 | x1 | 30.0 | y1 | 40.0 | z1 | 2.0 | 20.0 | 10.0 |
| 26 | x1 | 25.0 | y1 | 60.0 | z1 | 2.0 | 5.0 | 10.0 |
| 27 | x1 | 15.0 | y1 | 24.0 | z1 | 2.0 | 51.0 | 10.0 |
| 28 | x1 | 30.0 | y1 | 48.0 | z1 | 2.0 | 12.0 | 10.0 |
| 29 | x1 | 25.0 | y1 | 40.0 | — | 0.0 | 25.0 | 10.0 |
| 30 | x1 | 25.0 | y1 | 40.0 | z1 | 0.5 | 25.0 | 10.0 |
| 31 | x1 | 25.0 | y1 | 40.0 | z1 | 5.0 | 25.0 | 10.0 |
| 32 | x4 | 25.0 | y1 | 40.0 | z1 | 2.0 | 25.0 | 10.0 |
| 33 | x1 | 25.0 | y2 | 40.0 | — | 0.0 | 25.0 | 10.0 |
| 34 | x3 | 25.0 | y1 | 40.0 | z1 | 2.0 | 25.0 | 10.0 |
| 35 | x1 | 25.0 | y6 | 40.0 | z1 | 2.0 | 25.0 | 10.0 |
| 36 | x1 | 25.0 | y7 | 40.0 | — | 0.0 | 25.0 | 10.0 |
| 37 | x1 | 25.0 | y1 | 40.0 | z2 | 2.0 | 25.0 | 10.0 |

TABLE 5-2

| Resin fine particle dispersion liquid | X + Y Y/X | Number average particle diameter Dn (µm) | Element Kind | atomic % | B/A |
|---|---|---|---|---|---|
| 1 | 1.6 | 63.7 | 0.14 | Si | 5.1 | 1.40 |
| 2 | 2.5 | 54.9 | 0.14 | Si | 3.2 | 1.40 |
| 3 | 1.4 | 67.6 | 0.14 | Si | 5.9 | 1.40 |
| 4 | 0.8 | 44.1 | 0.14 | Si | 4.2 | 1.43 |
| 5 | 1.2 | 53.9 | 0.14 | Si | 4.6 | 1.41 |
| 6 | 2.2 | 78.4 | 0.14 | Si | 5.8 | 1.37 |
| 7 | 1.6 | 46.1 | 0.14 | Si | 3.2 | 1.41 |
| 8 | 1.6 | 64.4 | 0.15 | Si | 5.1 | 1.50 |
| 9 | 1.6 | 63.1 | 0.13 | Si | 5.1 | 1.29 |
| 10 | 1.6 | 62.5 | 0.13 | Si | 5.1 | 1.19 |
| 11 | 1.6 | 62.2 | 0.12 | Si | 5.1 | 1.13 |
| 12 | 1.6 | 63.7 | 0.14 | Si | 5.1 | 1.50 |
| 13 | 1.6 | 63.7 | 0.13 | Si | 5.1 | 1.46 |
| 14 | 1.6 | 63.1 | 0.13 | Si | 5.1 | 1.49 |
| 15 | 1.6 | 63.7 | 0.15 | Si | 5.1 | 1.45 |
| 16 | 1.6 | 63.7 | 0.14 | Si | 5.1 | 1.43 |
| 17 | 1.6 | 63.7 | 0.13 | Si | 5.1 | 1.26 |
| 18 | 1.6 | 63.7 | 0.12 | Si | 5.1 | 1.11 |
| 19 | 1.6 | 65.0 | 0.15 | Si | 5.1 | 1.47 |
| 20 | 1.6 | 65.0 | 0.14 | Si | 5.1 | 1.20 |
| 21 | 1.6 | 63.7 | 0.09 | Si | 5.1 | 1.10 |
| 22 | 1.6 | 63.7 | 0.12 | Si | 5.1 | 1.18 |
| 23 | 1.6 | 63.7 | 0.15 | Si | 5.1 | 1.49 |
| 24 | 2.7 | 53.9 | 0.14 | Si | 2.9 | 1.40 |
| 25 | 1.3 | 68.6 | 0.14 | Si | 6.1 | 1.40 |
| 26 | 2.4 | 83.3 | 0.14 | Si | 6.1 | 1.37 |
| 27 | 1.6 | 38.2 | 0.14 | Si | 2.4 | 1.42 |
| 28 | 1.6 | 76.5 | 0.14 | Si | 6.5 | 1.38 |
| 29 | 1.6 | 65.0 | 0.17 | Si | 5.1 | 1.61 |
| 30 | 1.6 | 64.7 | 0.16 | Si | 5.1 | 1.56 |
| 31 | 1.6 | 61.9 | 0.11 | Si | 5.1 | 1.08 |
| 32 | 1.6 | 63.7 | 0.14 | Si | 3.5 | 1.00 |
| 33 | 1.6 | 65.0 | 0.17 | Si | 5.1 | 1.67 |
| 34 | 1.6 | 63.7 | 0.14 | Si | 5.1 | 1.60 |
| 35 | 1.6 | 63.7 | 0.10 | Si | 5.1 | 1.00 |
| 36 | 1.6 | 65.0 | 0.11 | Si | 5.1 | 1.04 |
| 37 | 1.6 | 63.7 | 0.09 | Si | 5.1 | 1.05 |

<Synthesis of Crystalline Polyester 1>

The following raw materials were loaded into a two-necked flask that had been heated and dried while nitrogen was introduced into the flask.

| | |
|---|---|
| Sebacic acid | 123.0 parts by mass |
| 1,6-Hexanediol | 76.0 parts by mass |
| Dibutyltin oxide | 0.1 part by mass |

The system was purged with nitrogen by a decompression operation, and then the mixture was stirred at 180° C. for 6 hours. After that, while the stirring was continued, a temperature was gradually increased to 230° C. under reduced pressure, and was held at the temperature for 2 hours. When the mixture was brought into a viscous state, a reaction was stopped by cooling the mixture with air. Thus, a crystalline polyester 1 was synthesized. The melting point, Mn, and Mw of the crystalline polyester 1 were 73° C., 5,800, and 11,800, respectively.

<Synthesis of Block Polymer 1>

| | |
|---|---|
| Crystalline polyester 1 | 210.0 parts by mass |
| Xylylene diisocyanate (XDI) | 56.0 parts by mass |
| Cyclohexane dimethanol (CHDM) | 34.0 parts by mass |
| Tetrahydrofuran (THF) | 300.0 parts by mass |

The foregoing materials were loaded into a reaction vessel including a stirring device and a temperature gauge while the vessel was purged with nitrogen. The mixture was heated to 50° C. and subjected to a urethanization reaction over 15 hours. THF serving as a solvent was distilled off. Thus, a block polymer 1 was obtained. The melting point, Mn, and Mw of the block polymer 1 were 65° C., 16,500, and 33,500, respectively.

<Preparation of Block Polymer Solution 1>

128.0 Parts by mass of acetone serving as an organic solvent and 72.0 parts by mass of the block polymer 1 were loaded into a beaker with a stirring device. The mixture was heated to 50° C., and was continuously stirred until the polymer was completely dissolved. Thus, a block polymer solution 1 was prepared.

<Preparation of Colorant Dispersion Liquid 1>

| | |
|---|---|
| C.I. Pigment Blue 15:3 | 100.0 parts by mass |
| Acetone | 150.0 parts by mass |
| Glass beads (1 mm) | 300.0 parts by mass |

The foregoing materials were loaded into a heat-resistant glass container, and were dispersed with PAINT SHAKER (manufactured by Toyo Seiki Seisaku-Sho, Ltd.) for 5 hours, followed by the removal of glass beads with a nylon mesh. Thus, a colorant dispersion liquid 1 having a volume average particle diameter of 200 nm and a solid content of 40.0 mass % was obtained.

<Preparation of Wax Dispersion Liquid 1>

| | |
|---|---|
| Dipentaerythritol palmitate ester wax | 16.0 parts by mass |
| Wax dispersant (copolymer having a peak molecular weight of 8,500 prepared by subjecting 50.0 parts by mass of styrene, 25.0 parts by mass of n-butyl acrylate, and 10.0 parts by mass of acrylonitrile to graft copolymerization in the presence of 15.0 parts by mass of polyethylene) | 8.0 parts by mass |
| Acetone | 76.0 parts by mass |

The foregoing materials were loaded into a glass beaker with a stirring blade (manufactured by Iwaki Glass Co., Ltd.), and the wax was dissolved in acetone by heating the system to 50° C.

Next, the mixture in the system was gradually cooled while being gently stirred under the condition of 50 rpm. The mixture was cooled to 25° C. over 3 hours to provide a milky-white liquid.

The solution was loaded into a heat-resistant container together with 20 parts by mass of glass beads each having a diameter of 1 mm, and the materials were dispersed with PAINT SHAKER for 3 hours, followed by the removal of the glass beads with a nylon mesh. Thus, a wax dispersion liquid 1 having a volume average particle diameter of 270 nm and a solid content of 24.0 mass % was obtained.

Example 1

(Production of Toner Particles 1)

In an apparatus illustrated in FIGURE, first, valves V1 and V2, and a pressure-adjusting valve V3 were closed. 18.0 Parts by mass of the resin fine particle dispersion liquid 1 was loaded into a pressure-resistant granulation tank T1 including a filter for capturing toner particles and a stirring mechanism, and a temperature in the tank was adjusted to 40° C. Next, the valve V1 was opened, carbon dioxide (purity: 99.99%) was introduced from a carbon dioxide bomb B1 into the granulation tank T1 with a pump P1, and the valve V1 was closed when a pressure in the tank reached 2.0 MPa. Meanwhile, the block polymer solution 1, the colorant dispersion liquid 1, and the wax dispersion liquid 1 were loaded into a resin solution tank T2 to prepare a resin solution, and then a temperature in the tank was adjusted to 40° C.

Next, the valve V2 was opened, and while the contents in the granulation tank T1 were stirred at 2,000 rpm, the resin solution in the resin solution tank T2 were introduced into the granulation tank T1 with a pump P2. When the introduction of all the contents was terminated, the valve V2 was closed. The pressure in the granulation tank T1 after the introduction became 3.0 MPa. The mass of all introduced carbon dioxide was measured with a mass flowmeter. The measured value was 280.0 parts by mass.

It should be noted that the amounts (ratio) of the materials to be loaded into the resin solution tank T2 are as described below.

| Block polymer solution 1 | 100.0 parts by mass |
| Wax dispersion liquid 1 | 10.0 parts by mass |
| Colorant dispersion liquid 1 | 6.0 parts by mass |

After the introduction of the contents in the resin solution tank T2 into the granulation tank T1 had been terminated, granulation was performed by further stirring the contents at 2,000 rpm for 3 minutes. Thus, a dispersion of droplets of the resin solution was formed.

Next, the valve V1 was opened, carbon dioxide was introduced from the carbon dioxide bomb B1 into the granulation tank T1 with the pump P1, and the valve V1 was closed when the pressure in the tank reached 10.0 MPa. Thus, the extraction of acetone in a droplet in the dispersion into the dispersion medium was performed.

After that, the pressure-adjusting valve V3 was set to 10.0 MPa, the valve V1 was opened, and carbon dioxide was further flowed with the pump P1 while the pressure in the granulation tank T1 was maintained at 10.0 MPa. Through the foregoing operation, carbon dioxide containing acetone serving as an organic solvent extracted was discharged to the solvent recovery tank T3, and acetone and carbon dioxide were separated from each other.

In addition, after the discharge of carbon dioxide to the organic solvent recovery tank T3 had been started, acetone in the tank T3 was removed every 5 minutes. The operation was continued until acetone did not accumulate in the organic solvent recovery tank and hence could not be removed. Desolvation was terminated at the time point when acetone was not removed any longer, and the valve V1 was closed to terminate the flow of carbon dioxide.

Further, the pressure-adjusting valve V3 was opened little by little to reduce the pressure in the granulation tank T1 to atmospheric pressure. Thus, toner particles 1 captured by the filter were obtained.

The resultant toner particles 1 were evaluated for their particle size distribution and circularities. The particles had a D1 of 5.6 μm, a D4 of 6.2 μm, a D4/D1 of 1.10, an average circularity of 0.99, and a coefficient of variation of the circularities of 2.73.

It should be noted that the evaluation for the particle size distribution was performed based on the following criteria.
A: The D4/D1 value is less than 1.15.
B: The D4/D1 value is 1.15 or more and less than 1.20.
C: The D4/D1 value is 1.20 or more and less than 1.25.
D: The D4/D1 value is 1.25 or more and less than 1.30.
E: The D4/D1 value is 1.30 or more.

In addition, the evaluation for the coefficient of variation of the circularities was performed based on the following criteria.
A: The coefficient of variation of the circularities is less than 3.00.
B: The coefficient of variation of the circularities is 3.00 or more and less than 3.50.
C: The coefficient of variation of the circularities is 3.50 or more and less than 4.00.
D: The coefficient of variation of the circularities is 4.00 or more and less than 4.50.
E: The coefficient of variation of the circularities is 4.50 or more.

Examples 2 to 23 and Comparative Examples 1 to 14

Toner particles 2 to 23 and comparative toner particles 1 to 14 were obtained in exactly the same manner as in Example 1 except that in Example 1, the resin fine particle dispersion liquids 2 to 37 were used, respectively instead of the resin fine particle dispersion liquid 1. The results of the evaluations of the resultant toner particles 2 to 23 and comparative toner particles 1 to 14 are shown in Table 6.

TABLE 6

| | | Particle size distribution | | | | Circularity | | |
| --- | --- | --- | --- | --- | --- | --- | --- | --- |
| | Resin fine particle dispersion liquid | D4 | D1 | D4/D1 | Evaluation | Average circularity | Coefficient of variation | Evaluation |
| Example 1 | Resin fine particle dispersion liquid 1 | 6.2 | 5.6 | 1.10 | A | 0.99 | 2.73 | A |
| Example 2 | Resin fine particle dispersion liquid 2 | 8.8 | 7.2 | 1.22 | C | 0.97 | 3.52 | C |
| Example 3 | Resin fine particle dispersion liquid 3 | 7.8 | 6.6 | 1.18 | B | 0.97 | 3.79 | C |
| Example 4 | Resin fine particle dispersion liquid 4 | 8.0 | 6.6 | 1.21 | C | 0.97 | 3.51 | C |
| Example 5 | Resin fine particle dispersion liquid 5 | 7.4 | 6.3 | 1.17 | B | 0.98 | 3.26 | B |
| Example 6 | Resin fine particle dispersion liquid 6 | 7.4 | 6.4 | 1.16 | B | 0.97 | 3.71 | C |
| Example 7 | Resin fine particle dispersion liquid 7 | 8.9 | 7.2 | 1.23 | C | 0.98 | 3.42 | B |
| Example 8 | Resin fine particle dispersion liquid 8 | 7.5 | 6.1 | 1.23 | C | 0.98 | 3.46 | B |
| Example 9 | Resin fine particle dispersion liquid 9 | 6.7 | 5.9 | 1.14 | A | 0.98 | 3.31 | B |
| Example 10 | Resin fine particle dispersion liquid 10 | 7.3 | 6.2 | 1.17 | B | 0.97 | 3.64 | C |
| Example 11 | Resin fine particle dispersion liquid 11 | 7.4 | 6.3 | 1.18 | B | 0.97 | 3.77 | C |
| Example 12 | Resin fine particle dispersion liquid 12 | 7.7 | 6.2 | 1.24 | C | 0.98 | 3.48 | B |
| Example 13 | Resin fine particle dispersion liquid 13 | 7.0 | 5.9 | 1.18 | B | 0.98 | 3.35 | B |

TABLE 6-continued

| — | Resin fine particle dispersion liquid | Particle size distribution | | | | Circularity | | |
|---|---|---|---|---|---|---|---|---|
| | | D4 | D1 | D4/D1 | Evaluation | Average circularity | Coefficient of variation | Evaluation |
| Example 14 | Resin fine particle dispersion liquid 14 | 7.4 | 6.0 | 1.23 | C | 0.98 | 3.42 | B |
| Example 15 | Resin fine particle dispersion liquid 15 | 7.3 | 6.2 | 1.17 | B | 0.99 | 2.96 | A |
| Example 16 | Resin fine particle dispersion liquid 16 | 7.1 | 6.1 | 1.16 | B | 0.99 | 2.83 | A |
| Example 17 | Resin fine particle dispersion liquid 17 | 7.0 | 6.0 | 1.16 | B | 0.98 | 3.48 | B |
| Example 18 | Resin fine particle dispersion liquid 18 | 7.4 | 6.3 | 1.17 | B | 0.97 | 3.83 | C |
| Example 19 | Resin fine particle dispersion liquid 19 | 7.3 | 6.0 | 1.21 | C | 0.98 | 3.37 | B |
| Example 20 | Resin fine particle dispersion liquid 20 | 7.1 | 6.1 | 1.17 | B | 0.97 | 3.61 | C |
| Example 21 | Resin fine particle dispersion liquid 21 | 7.5 | 6.3 | 1.19 | B | 0.97 | 3.85 | C |
| Example 22 | Resin fine particle dispersion liquid 22 | 7.3 | 6.2 | 1.18 | B | 0.97 | 3.66 | C |
| Example 23 | Resin fine particle dispersion liquid 23 | 7.3 | 6.0 | 1.22 | C | 0.98 | 3.44 | B |
| Comparative Example 1 | Resin fine particle dispersion liquid 24 | 9.3 | 7.5 | 1.24 | C | 0.95 | 4.21 | D |
| Comparative Example 2 | Resin fine particle dispersion liquid 25 | 9.1 | 7.2 | 1.26 | D | 0.96 | 3.86 | C |
| Comparative Example 3 | Resin fine particle dispersion liquid 26 | 9.0 | 7.0 | 1.28 | D | 0.97 | 3.81 | C |
| Comparative Example 4 | Resin fine particle dispersion liquid 27 | 9.8 | 7.9 | 1.24 | C | 0.95 | 4.46 | D |
| Comparative Example 5 | Resin fine particle dispersion liquid 28 | 9.6 | 7.5 | 1.28 | D | 0.97 | 3.96 | C |
| Comparative Example 6 | Resin fine particle dispersion liquid 29 | 8.3 | 6.5 | 1.28 | D | 0.95 | 4.45 | D |
| Comparative Example 7 | Resin fine particle dispersion liquid 30 | 7.9 | 6.3 | 1.26 | D | 0.96 | 4.34 | D |
| Comparative Example 8 | Resin fine particle dispersion liquid 31 | 7.7 | 6.3 | 1.23 | C | 0.96 | 4.16 | D |
| Comparative Example 9 | Resin fine particle dispersion liquid 32 | 12.6 | 8.2 | 1.53 | E | 0.94 | 4.69 | E |
| Comparative Example 10 | Resin fine particle dispersion liquid 33 | 8.1 | 6.3 | 1.29 | D | 0.95 | 4.49 | D |
| Comparative Example 11 | Resin fine particle dispersion liquid 34 | 8.2 | 6.4 | 1.28 | D | 0.95 | 4.41 | D |
| Comparative Example 12 | Resin fine particle dispersion liquid 35 | 8.4 | 6.5 | 1.29 | D | 0.95 | 4.45 | D |
| Comparative Example 13 | Resin fine particle dispersion liquid 36 | 8.1 | 6.4 | 1.26 | D | 0.96 | 4.35 | D |
| Comparative Example 14 | Resin fine particle dispersion liquid 37 | 8.3 | 6.5 | 1.27 | D | 0.96 | 4.24 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-263978, filed Dec. 26, 2014, and Japanese Patent Application No. 2015-240888, filed Dec. 10, 2015, which are hereby incorporated by reference herein in their entirety.

What is claimed is:

1. A method of producing a toner comprising a toner particle, the method comprising the steps of:
   (e) mixing a resin R, a colorant, and an organic solvent to prepare a resin solution;
   (f) mixing the resin solution, a resin fine particle, and carbon dioxide in a pressure container to form such a dispersion that a droplet of the resin solution having a surface covered with the resin fine particle is dispersed in a dispersion medium comprising the carbon dioxide;
   (g) introducing carbon dioxide in a liquid state into the pressure container and pressurizing the pressure container to extract the organic solvent in the droplet into the dispersion medium; and
   (h) removing the organic solvent extracted into the dispersion medium from an inside of the pressure container together with the carbon dioxide to provide a toner particle, wherein
   the resin fine particle comprises a resin S containing an element α, the resin S being a polymerized product of a monomer composition comprising an organic polysiloxane compound having a vinyl group, and a polyester having a polymerizable unsaturated group,
   the polyester being a polycondensate of a dicarboxylic acid and a diol, and the polymerizable unsaturated group of the polyester is derived from at least one of a dicarboxylic acid having the polymerizable unsaturated group and a diol having the polymerizable unsaturated group, an average number of polymerizable unsaturated groups in one molecule of the polyester being 1.5 to 2.5,
   the resin fine particle satisfies formulae (1) and (2):

$$3.0 \leq A \leq 6.0 \quad (1)$$

$$1.10 \leq B/A \leq 1.55 \quad (2)$$

where "A" represents an amount (atomic %) of the element α of the resin fine particle measured by X-ray photoelectron spectroscopy (ESCA), and
"B" represents an amount (atomic %) of the element α of a treated resin fine particle measured by the X-ray photoelectron spectroscopy, the treated resin fine particle being obtained by
loading a dispersion obtained by dispersing the resin fine particle in the organic solvent into the pressure container,
introducing carbon dioxide into the pressure container, and
flowing carbon dioxide through the pressure container while maintaining a pressure in the pressure container at 6.5 MPa and a temperature in the pressure container at 25° C. to remove the organic solvent from the dispersion.

2. A method of producing a toner according to claim 1, wherein the element α is Si.

3. A method of producing a toner according to claim 2, wherein the element Si is derived from an organic polysiloxane structure.

4. A method of producing a toner according to claim 1, wherein the resin S is a resin having, on a side chain thereof, a moiety having an organic polysiloxane structure; and
   the moiety having an organic polysiloxane structure has a weight average molecular weight (Mw) of 400 to 2,000.

5. A method of producing a toner according to claim 1, wherein the resin S has a crosslinked structure.

6. A method of producing a toner according to claim 1, wherein the resin R contains a polyester as a main component.

7. A method of producing a toner according to claim 1, wherein an average number of polymerizable unsaturated groups in one molecule of the polyester having a polymerizable unsaturated group is 1.0 to 3.0.

8. A method of producing a toner according to claim 1, wherein in the monomer composition, a mass ratio (Y/X) of the polyester (Y) having a polymerizable unsaturated group to the organic polysiloxane compound (X) having a vinyl group is 1.0 to 2.3, and a total of the organic polysiloxane compound and the polyester having a polymerizable unsaturated group is 45.0 to 80.0 mass % with respect to a total amount of monomers of the resin S.

9. A method of producing a toner according to claim 1, wherein the monomer composition further comprises a monomer having two or more polymerizable unsaturated groups, the monomer having a weight average molecular weight (Mw) of 200 to 2,000, in addition to the polyester having a polymerizable unsaturated group.

10. A method of producing a toner according to claim 9, wherein an amount of the monomer having two or more polymerizable unsaturated groups is 1.0 to 5.0 mass % with respect to a total amount of monomers of the resin S.

* * * * *